US012507025B2

(12) United States Patent
Cordourier Maruri et al.

(10) Patent No.: US 12,507,025 B2
(45) Date of Patent: Dec. 23, 2025

(54) METHODS AND APPARATUS TO EXPAND ACOUSTIC RENDERING RANGES

(71) Applicant: Intel Corporation, Santa Clara, CA (US)

(72) Inventors: Hector Cordourier Maruri, Guadalajara (MX); Jesus Rodrigo Ferrer Romero, Guadalajara (MX); Willem Beltman, West Linn, OR (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 17/843,699

(22) Filed: Jun. 17, 2022

(65) Prior Publication Data

US 2022/0329961 A1 Oct. 13, 2022

(51) Int. Cl.
*H04S 7/00* (2006.01)
*H04R 3/00* (2006.01)

(52) U.S. Cl.
CPC ............. *H04S 7/302* (2013.01); *H04R 3/005* (2013.01); *H04R 2430/20* (2013.01); *H04S 2420/01* (2013.01)

(58) Field of Classification Search
CPC ..... H04R 2430/20; H04R 3/005; H04S 7/302; H04S 7/303; H04S 7/304
See application file for complete search history.

(56) References Cited

U.S. PATENT DOCUMENTS

| | | | | |
|---|---|---|---|---|
| 11,546,687 | B1 * | 1/2023 | Delikaris Manias ... | H04S 7/304 |
| 2004/0076301 | A1 * | 4/2004 | Algazi .................... | H04S 7/304 381/310 |
| 2018/0206038 | A1 * | 7/2018 | Tengelsen .............. | H04R 3/005 |
| 2019/0014432 | A1 * | 1/2019 | Eriksen ................... | H04S 7/304 |
| 2020/0245092 | A1 * | 7/2020 | Badhwar ................. | H04L 67/10 |

* cited by examiner

*Primary Examiner* — Sunita Joshi
(74) *Attorney, Agent, or Firm* — Akona IP PC

(57) ABSTRACT

Methods, apparatus, systems, and articles of manufacture are disclosed. An example apparatus includes instructions that, when executed, cause processor circuitry to at least: obtain audio data channels produced by physical capture devices; calculate: a first plurality of angles corresponding to ones of the physical capture devices, the first plurality of angles to describe how sound produced by an audio source arrives to the physical capture devices, a location of the audio source based on the first plurality of angles, a location of virtual capture arrays, and a second plurality of angles to describe how sound produced by the audio source would arrive to the virtual capture arrays; interpolate between two angles from either of the first plurality or the second plurality of angles; and render a binaural audio signal based on the audio data channels and the interpolated angle.

25 Claims, 12 Drawing Sheets

METHODS AND APPARATUS TO EXPAND ACOUSTIC RENDERING RANGES

FIELD OF THE DISCLOSURE

This disclosure relates generally to audio and, more particularly, to methods and apparatus to expand acoustic rendering ranges.

BACKGROUND

In recent years, efforts to develop immersive media experiences have grown. Examples of immersive media experiences include but are not limited to augmented reality, virtual reality, etc. In some examples of immersive media, subject matter may be recorded with a plurality of cameras and a plurality of microphones. In such examples, the plurality of data may be combined such that a viewer can transition between different perspectives of the subject matter during a media presentation.

BRIEF DESCRIPTION OF THE DRAWINGS

In general, the same reference numbers will be used throughout the drawing(s) and accompanying written description to refer to the same or like parts. The figures are not to scale.

Figure 1:
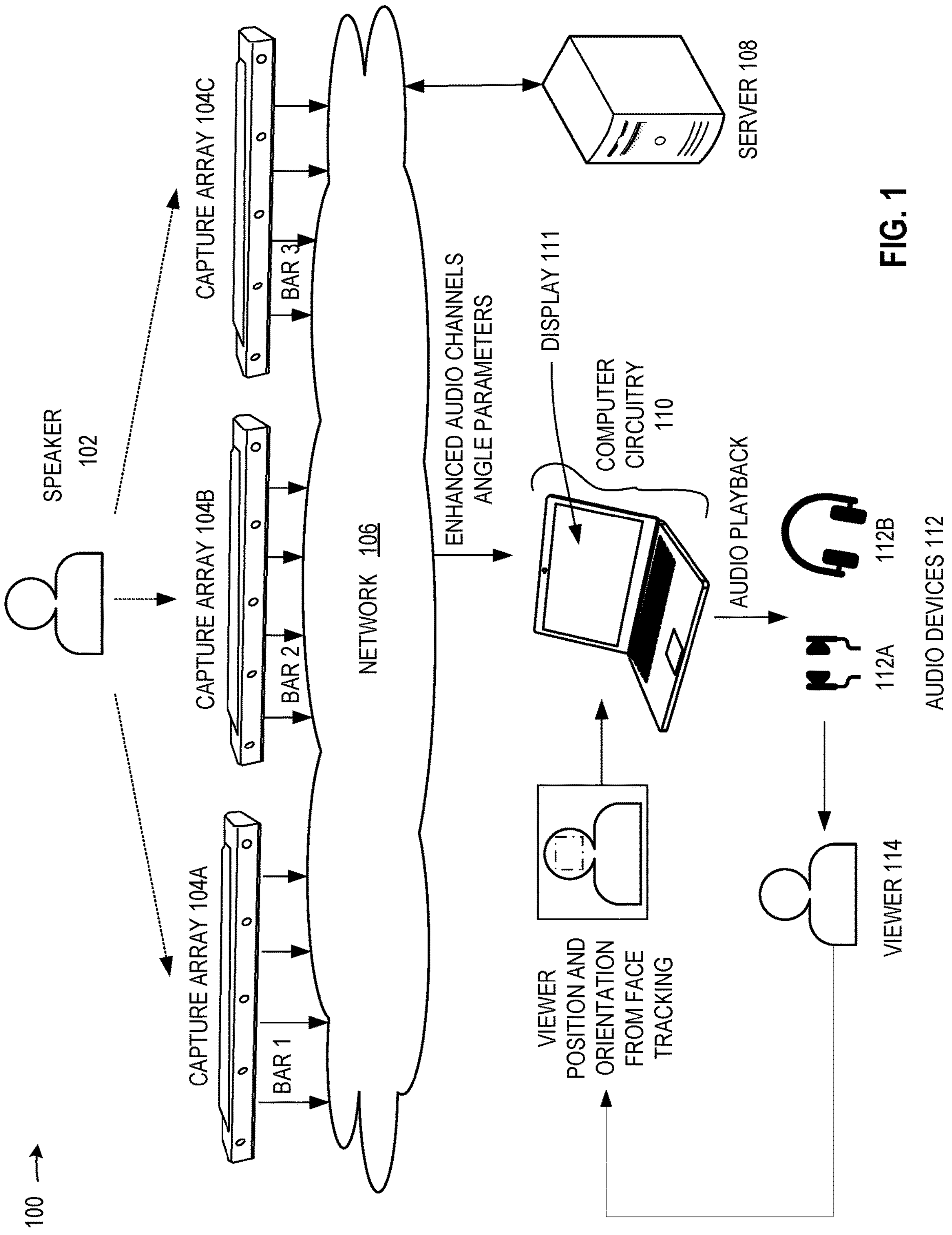
FIG. 1 is an illustrative example of a speaker and a viewer in an audio/visual (A/V) system.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or m intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

An important component of immersive media experiences having a plurality of perspectives is maintaining quality across the plurality of perspectives. When designing a system to record and view an immersive media experience, a manufacturer may aim to minimize user detectability of a transitions between perspectives. In doing so, a viewer may be more likely to perceive the presented media as being within a continuous environment (i.e., immersive) rather than within separate perspectives.

While an immersive media system may record audio and video data of a subject from a plurality of camera and microphone perspectives, a viewer may be limited to a single display to view the media and a single audio device to listen to the media. Therefore, an immersive media system may use binaural rendering to combine audio signals from a plurality of channels (e.g., front and/or rear, left and/or right, etc.) into two final channels. As used herein, binaural audio refers to audio that, when heard by a listener, sounds as if the listener is in the same environment as the sound source. To record binaural audio, a sound source may be recorded by two or more microphone sensors. To render the binaural audio, a device may create two separate audio signals for each ear of a listener.

An immersive media system may determine which audio channels to render based on a viewer's position and orientation relative to a display. However, when the viewer is at an extreme position such as the edge of the detectable area, previous solutions to render audio in a similar immersive media environment may provide a lower quality perspective to the viewer due to a lack of audio or visual data corresponding to the viewer position and orientation. For example, the lack of audio or visual data may cause a viewer to hear audio that is not representative of their extreme orientation.

Example methods, apparatus, and systems herein expand the range of audio rendering when a viewer is oriented at an extreme angle relative to the display. An example A/V media system includes a number of capture arrays (e.g., three capture arrays) configured to record audio and video of a speaker from a plurality of perspectives. The A/V data channels are transmitted to example server circuitry that calculates angles of arrival (AoAs) between the audio source (e.g., the speaker) and each of the capture arrays. The example server circuitry transmits the AoAs and audio channels to example computer circuitry used by a viewer. The example computer circuitry includes coordinate circuitry that uses the angle of arrival to calculate the location of the physical capture arrays, and to calculate the location of virtual capture arrays. A virtual capture array refers to a location and orientation where an additional physical capture array could be placed to cause an increase in the detectability zone of the speaker. The example computer circuitry uses the location of the physical and virtual capture arrays to calculate angles of arrival between the audio source and the virtual capture arrays. The example computer circuitry interpolates between two AoAs based on example face tracker circuitry that monitors the position and orientation of an example viewer. The example computer circuitry determines a position on a physical capture array that accurately emulates the position and orientation. The two AoAs may represent either a physical or virtual capture arrays. As a result, the example computer circuitry calculates new AoA parameters that are more representative of extreme viewer orientations than previous solutions and result in higher quality audio.

FIG. 1 is an illustrative example of a speaker and a viewer in an A/V system. The example A/V system 100 includes a speaker 102, example capture arrays 104A, 104B, 104C, an example network 106, an example server 108, example computer circuitry 110, example display 111, example audio devices 112A, 112B, and a viewer 114.

The example speaker 102 creates media. The subject matter of the created media includes, but is not limited to, the example speaker 102. For example, the speaker 102 may include themselves in livestream media. As used herein, livestream media refers to media that is created by a speaker 102, transmitted via the example network 106, and viewed by a remote audience in real time or with minimal latency. To create livestream media, the example speaker 102 may speak aloud and/or move within their environment. The example speaker 102 may be in any environment. For example, the speaker 102 may be located in a bedroom, an office, a music or gaming studio, etc.

The example capture arrays 104A, 104B, 104C record audio and visual data corresponding to the speaker. For example, the example capture arrays 104A, 104B, 104C may record the voice of the speaker 102, and/or any additional audio produced within the environment of the speaker 102. Similarly, the example capture arrays may record video of the speaker 102 moving and/or generally creating media within the environment. The audio and video recorded by the example capture arrays 104A, 104B, 104C may be referred to as "raw" A/V data channels because the data has not been processed or modified since the time of recording. While the example A/V system 100 includes three capture arrays 104A, 104B, 104C, in other examples, any number of capture arrays may be used.

In some examples, the circuitry and sensors within the example capture array 104A may be housed in rectangular packaging. In such examples, a capture array 104A may be referred to as a "bar" due to its shape. For example, within the A/V system 100, each of the example capture arrays 104A, 104B, 104C may be considered a bar. As used herein, the term "bar" and "capture array" may be used interchangeably.

An example capture array 104A includes both multiple camera sensors to record multiple video data channels and multiple microphone sensors to record multiple audio data channels. Furthermore, the example capture arrays 104A, 104B, 104C are physically positioned and oriented within the environment such that they record the example speaker 102 from a plurality of perspectives. The example capture arrays 104A, 104B, 104C provide the plurality of raw A/V data channels from all available perspectives to the server 108 via the network 106.

The example network 106 connects and facilitates communication between the example capture arrays 104A, 104B, 104C, the example server 108, and example computer circuitry 110. In this example, the network 106 is the Internet. However, the example network 106 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used above and herein, the term "communicate" including variances (e.g., secure or non-secure communications, compressed or non-compressed communications, etc.) thereof, encompasses direct communication and/or indirect communication through one or more intermediary components and does not require direct physical (e.g., wired) communication and/or constant communication, but rather includes selective communication at periodic or aperiodic intervals, as well as one-time events.

The example server 108 receives a plurality of audio data channels and a plurality of video data channels from each of the capture arrays 104A, 104B, 104C. The example server enhances the data channels from a given bar and determine an AoA for said bar. As used herein, an AOA refers to the angle at which audio arrives to the given bar from the one or more sound sources (e.g., the example speaker 102). The example server provides the enhanced data channels and AoAs from all bars located in the environment of the speaker 102 to the example computer circuitry 110 via the network 106. Specifically, the AoAs calculated by the example server 108 describe the angle that audio to the center of their respective bars. The example server 108 is discussed further in connection with FIG. 2.

The example computer circuitry 110 receives the enhanced data channels and AoAs from the example server 108. The example computer circuitry 110 uses the enhanced data channels and angle parameters to render binaural audio with an expanded acoustic range in accordance with the teachings of this disclosure. The example computer circuitry 110 provides the rendered binaural audio to one or more example audio devices 112 and merges video data channels for presentation on the display 111 based on the position and orientation of the example viewer 114. The example display 111 may be any type of display, including but not limited to a laptop screen (as depicted in FIG. 1), an external monitor, a projector, etc. To ensure that the presented perspective of the media changes as part of the immersive experience, the example computer circuitry 110 may be implemented with an internal camera, or access an external camera, to determine the position and orientation of the viewer 114 via facial recognition. The example computer circuitry 110 is described further in connection with FIG. 3.

One or more of the example audio devices 112 may include, but are not limited to, earbuds 112A and/or headphones 112B, a speaker, etc. that play the binaurally rendered audio. One or more of the example audio devices 112 may be used by the viewer 114 to listen to the media created by the speaker 102.

The A/V system 100 is an example implementation of an immersive content creation and distribution system. The example A/V system 100 is designed to be immersive in the sense that the position and orientation of the viewer 114 influences both the visual perspective of the media on the display 111 (e.g., which video channel is presented) and the audio played from the one or more audio devices 112. As such, the example computer circuitry 110 may be required to switch between audio data channels to match the perspective of the viewer 114. For example, if the viewer 114 is looking to their left to watch the speaker 102 on the display 111, the computer circuitry 110 may render audio channel data from capture array 104C because the capture array 104C is located to the left of the speaker 102.

Previous implementations to render binaural audio lack the ability to compute angle parameters and render audio that accurately represent the viewer 114 at extreme positions and orientations, which decreases the quality of a user experience. Advantageously, when the example viewer 114 is at an extreme position and orientation, the example A/V system 100 uses the computer circuitry 110 to compute new angle parameters that more accurately represent the viewer's extreme position. These new angle parameters are used in a binaural rendering of audio sources that results in a higher quality user experience.

Figure 2:
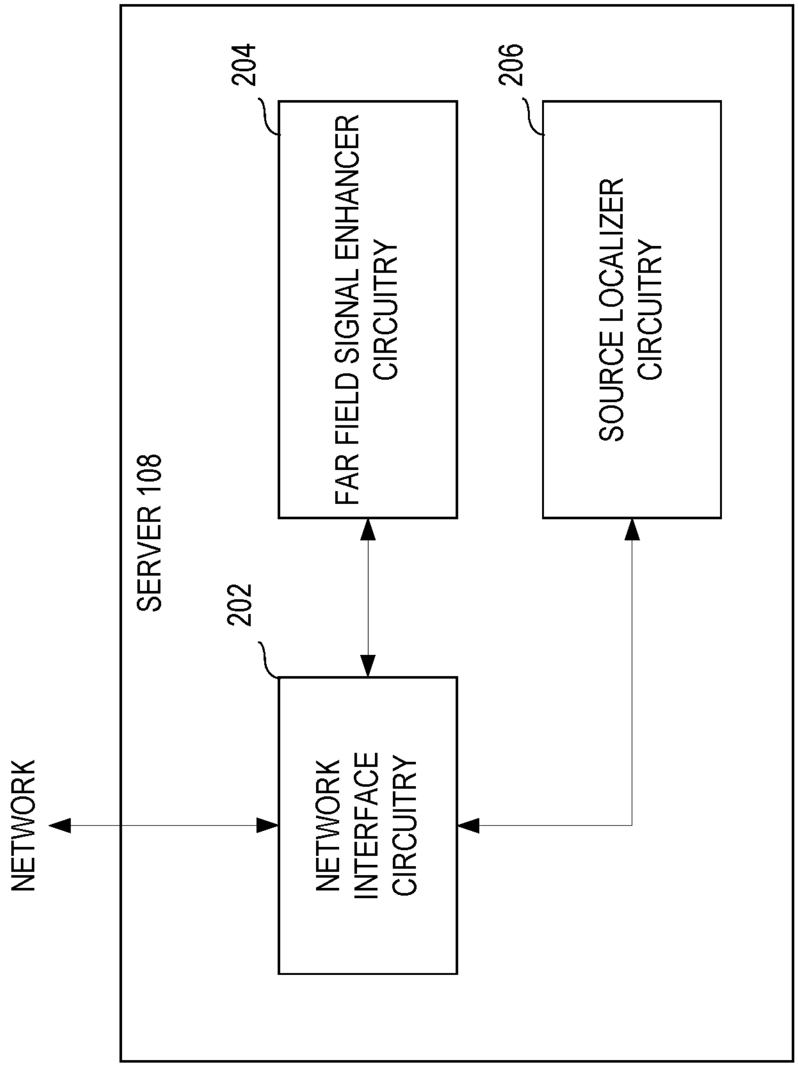
FIG. 2 is an example block diagram of the server of FIG. 1.

FIG. 2 is an example block diagram of the example server 108 of FIG. 1. The example server 108 includes example network interface circuitry 202, example far field signal enhancer circuitry 204, and example source localizer circuitry 206.

The example network interface circuitry 202 sends and receives data to and from the example network 106. For example, the network interface circuitry 202 receives a plurality of raw audio data channels and a plurality of raw video data channels from each of the capture arrays 104A, 104B, 104C via the network 106. The example network interface circuitry 202 also sends enhanced data channels and angle parameters corresponding to each of the capture arrays 104A, 104B, 104C to the example computer circuitry 110 via the network 106. The example network interface circuitry 202 may implement one or more suitable communication protocols to transfer data over the network 106. Example communication protocols for data transfer over a network include but are not limited to Wi-Fi™, Ethernet, etc. In some examples, the example network interface circuitry 202 is instantiated by processor circuitry executing network interface instructions and/or configured to perform operations such as those represented by the flowchart of FIG. 6.

The example far field signal enhancer circuitry 204 receives the raw data audio channels from the example network interface circuitry 202. The raw data audio channels are used as inputs by the example far field signal enhancer circuitry 204 to produce the enhanced audio data channels. Because each of the capture arrays 104A, 104B, 104C are independent devices, there may be small, randomly occurring time differences between when each bar records a given audio segment. To account for this difference, the example far field signal enhancer circuitry 204 may enhance the raw audio data channels by synchronizing the audio. For example, the far field signal enhancer circuitry 204 may use a Generalized Cross Correlation Phase Transformation (GCC-PHAT) to measure the time delay between the bars. The example far field signal enhancer circuitry 204 may move certain audio segments in time based on the measured time delay to synchronize signals and produce enhanced audio data channels. In some examples, the example far field signal enhancer circuitry 204 is instantiated by processor circuitry executing network interface instructions and/or configured to perform operations such as those represented by the flowchart of FIG. 6.

The example source localizer circuitry 206 computes an AoA for each bar within the environment of the speaker 102. To compute the AoA of a given bar (e.g., capture array 104A), the example source localizer circuitry 206 may use any technique for acoustic localization. For example, the example source localizer circuitry 206 may determine the time difference between when a first microphone sensor within the capture array 104A records a given audio segment and when a second microphone sensor within the capture array 104A records the same audio segment. The example source localizer circuitry 206 may use the time difference, along with the physical distance between the first microphone sensor and second microphone sensor, to perform a triangulation technique and compute the AoA. Triangulation refers to the process of determining the location of a point (e.g., the location of the speaker 102 and/or other sound source) by measuring the length of one side of each triangle (e.g., the distance between the microphone sensors) and deducing its angles and the length of the other two sides by observation (e.g., the time difference) from a baseline. In such examples, the angles determined by the example source localizer circuitry 206 when performing a triangulation technique includes the AoA.

In addition to the AoA parameters, the example source localizer circuitry 206 may provide location data to the example network interface circuitry 302. The location data may describe the position of the example capture arrays 104A, 104B, 104C based on a coordinate system that is also used to determine AoA parameters. In some examples, the example source localizer circuitry 206 is instantiated by processor circuitry executing network interface instructions and/or configured to perform operations such as those represented by the flowchart of FIG. 6.

The example server 108 enhances raw A/V data and determines AoA parameters, both of which are used as inputs to the binaural audio rendering with smooth transitions that is performed by the example computer circuitry 110. While the example server 108 is implemented in the example A/V system 100, in other examples, the server 108 may not be implemented. In such examples, the capture arrays 104A, 104B, 104C send raw A/V data channels directly to the computer circuitry 110 via the network 106. Furthermore, in such examples, the far field signal enhancer circuitry 204 and the source localizer circuitry 206 are implemented within the computer circuitry 110.

In some examples, the apparatus includes means for receiving audio data channels produced by physical capture devices and location data of the physical capture devices. For example, the means for receiving may be implemented by network interface circuitry 302. In some examples, the network interface circuitry 302 may be instantiated by processor circuitry such as the example processor circuitry 912 of FIG. 9. For instance, the network interface circuitry 302 may be instantiated by the example microprocessor 1000 of FIG. 10 executing machine executable instructions such as those implemented by at least blocks 602 of FIG. 6. In some examples, the network interface circuitry 302 may be instantiated by hardware logic circuitry, which may be implemented by an ASIC, XPU, or the FPGA circuitry 1100 of FIG. 11 structured to perform operations corresponding to the machine readable instructions. Additionally or alternatively, the network interface circuitry 302 may be instantiated by any other combination of hardware, software, and/or firmware. For example the network interface circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for enhancing raw A/V data channels. For example, the means for enhancing raw A/V data channels may be implemented by far field signal enhancer circuitry 204. In some examples, the far field signal enhancer circuitry 204 may be instantiated by processor circuitry such as the example processor circuitry 912 of FIG. 9. For instance, the far field signal enhancer circuitry 204 may be instantiated by the example microprocessor 1000 of FIG. 10 executing machine executable instructions such as those implemented by at least blocks 604 of FIG. 6. In some examples, the far field signal enhancer circuitry 204 may be instantiated by hardware logic circuitry, which may be implemented by an ASIC, XPU, or the FPGA circuitry 1100 of FIG. 11 structured to perform operations corresponding to the machine readable instructions. Additionally or alternatively, the far field signal enhancer circuitry 204 may be instantiated by any other combination of hardware, software, and/or firmware. For example far field signal enhancer circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for calculating a first plurality of angles corresponding to ones of the physical capture devices. For example, the means for calculating a first plurality of angles may be implemented by source localizer circuitry 206. In some examples, the may be instantiated by processor circuitry such as the example processor circuitry 912 of FIG. 9. For instance, source localizer circuitry 206 may be instantiated by the example microprocessor 1000 of FIG. 10 executing machine executable instructions such as those implemented by at least blocks 606 of FIG. 6. In some examples, the source localizer circuitry 206 may be instantiated by hardware logic circuitry, which may be implemented by an ASIC, XPU, or the FPGA circuitry 1100 of FIG. 11 structured to perform operations corresponding to the machine readable instructions. Additionally or alternatively, the source localizer circuitry 206 may be instantiated by any other combination of hardware, software, and/or firmware. For example source localizer circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 3:
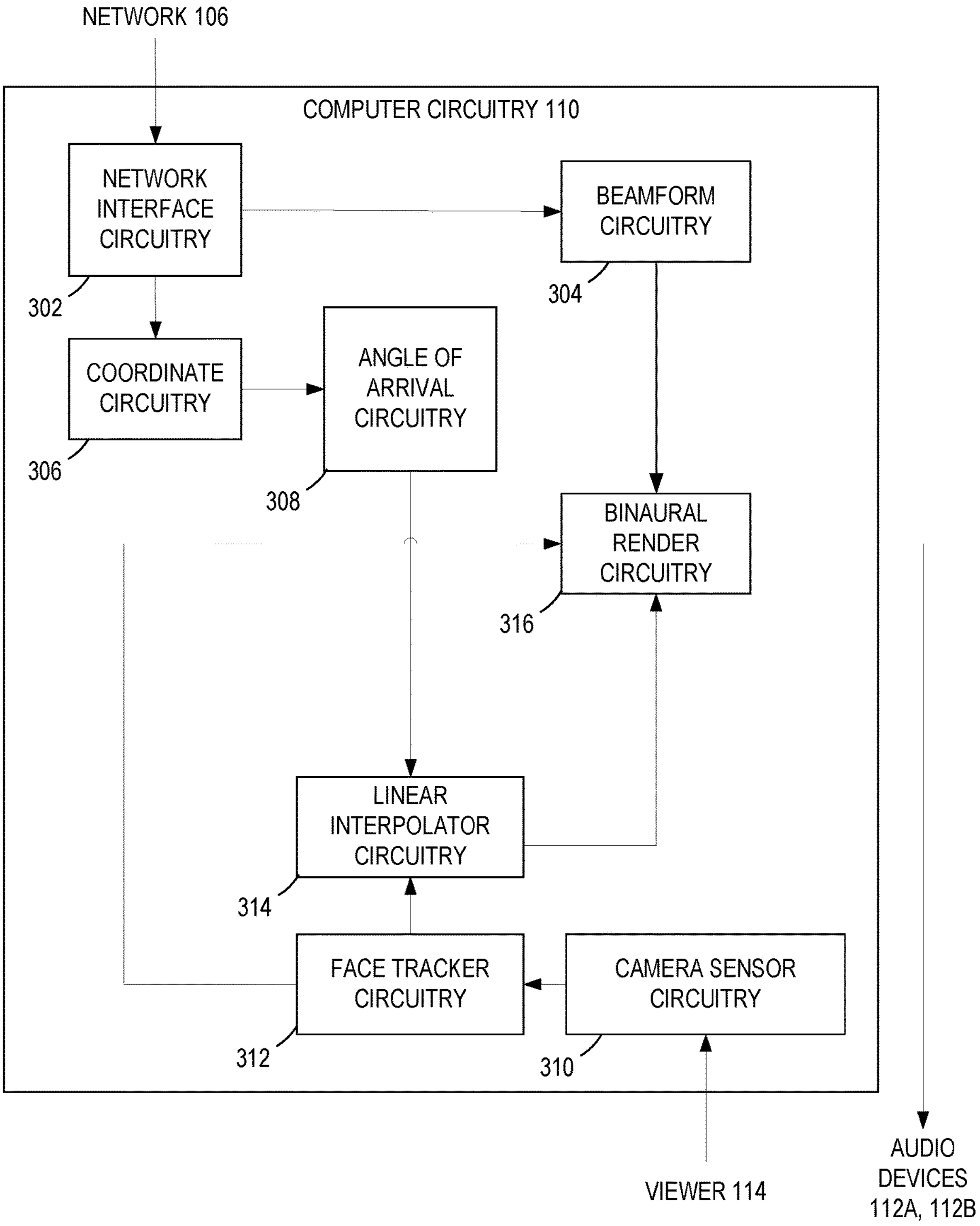
FIG. 3 is an example block diagram of the computer circuitry of FIG. 1.

FIG. 3 is a block diagram of example computer circuitry 110 to render binaural audio with smooth transitions. The example computer circuitry 110 of FIG. 3 may be instantiated (e.g., creating an instance of, bring into being for any length of time, materialize, implement, etc.) by processor circuitry such as a central processing unit executing instructions. Additionally or alternatively, the example computer circuitry 110 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

The example computer circuitry 110 includes example network interface circuitry 302, example beamform circuitry 304, example coordinate circuitry 306, example AoA circuitry 308, example camera sensor circuitry 310, example face tracker circuitry 312, example linear interpolator circuitry 314, and example binaural render circuitry 316.

The example network interface circuitry 302 receives enhanced A/V data channels and AoA parameters from the example server 108 via the network 106. Like the example network interface circuitry 202 of FIG. 2, the example network interface circuitry 302 of FIG. 3 may implement one or more suitable communication protocols to transfer data over the network 106.

The example beamform circuitry 304 produces beamformed audio signals that strengthens audio data corresponding to the direction of arrival and reduces audio data corresponding to other directions. The example beamform circuitry 304 may align and merge the enhanced audio channels from the example capture arrays 104A, 104B, 104C to produce the beamformed audio signals. The example beamform circuitry 304 may use any signal processing technique to align and merge enhanced audio channels. The example beamform circuitry 304 may receive four enhanced audio channels from each capture array and output one beamformed signal for the capture array. In some examples, the example beamform circuitry 304 is instantiated by processor circuitry executing network interface instructions and/or configured to perform operations such as those represented by the flowchart of FIG. 6.

The example coordinate circuitry 306 uses the AoA parameters from the network interface circuitry 302 to calculate the coordinates of an audio source in the environment of the example speaker 102. The example coordinate circuitry 306 also calculates the location data from the network interface circuitry 302 to calculate the coordinates of two virtual bars. As used herein, a virtual bar refers to a mathematical model used to describe the position and AoA of a hypothetical capture array within the environment of the example speaker 102. Furthermore, the example capture arrays 104A, 104B, 104C may be referred to as physical bars to be easily distinguishable from virtual bars. In examples where the number of physical bars is not three, the example coordinate circuitry 306 may calculate coordinates for a different number of virtual bars. The example coordinate circuitry 306 is discussed further in connection with FIG. 5. In some examples, the example coordinate circuitry 306 is instantiated by processor circuitry executing network interface instructions and/or configured to perform operations such as those represented by the flowchart of FIG. 6.

The example AoA circuitry 308 calculates new AoA parameters. Like the example source localizer circuitry 206 of FIG. 2, the example AoA circuitry 308 may use any audio localization technique including but not limited triangulation. For example, the AoA circuitry 308 uses coordinates from the two virtual bars to calculate AoA parameters for each of the two virtual bars. The example AoA circuitry is discussed further in connection with FIG. 5. In some examples, the example AoA circuitry 308 is instantiated by processor circuitry executing network interface instructions and/or configured to perform operations such as those represented by the flowchart of FIG. 6.

The example camera sensor circuitry 310 records video data of the example viewer 114. The example camera sensor circuitry 310 may implement any type of image sensor to record video data. While FIG. 3 illustrates the example camera sensor circuitry 310 within the example circuitry 110, in other examples, the example camera sensor circuitry 310 may be implemented as an independent device that is external to the computer circuitry 110. The example camera sensor circuitry 310 provides the video data to the example face tracker circuitry 312

The example face tracker circuitry 312 uses the video data to perform facial recognition and track the position and orientation of the example viewer 114. The example face tracker circuitry 312 then uses the position data to select two bars that best represent how the viewer 114 would hear the speaker 102 if the viewer 114 was located in the environment of the speaker 102. The example face tracker circuitry 312 may select both physical and virtual bars to best represent the position of the viewer 114. When the example viewer 114 moves or shifts, the example face tracker circuitry 312 may change which bars are selected to represent the current orientation of the viewer 114. The example face tracker circuitry 312 is discussed further in connection with FIG. 4.

The example linear interpolator circuitry 314 performs a linear interpolation between the AoAs of the two bars selected by the example face tracker circuitry 312. In doing so, the linear interpolator circuitry 314 produces "middle" AoA parameters that accurately describes the angle at which sound from the speaker 102 would arrive at the example viewer 114 if the example viewer were in the same environment of the speaker 102 and had the same orientation as described by the face tracker circuitry 312. In some examples, the example linear interpolator circuitry 314 is instantiated by processor circuitry executing network interface instructions and/or configured to perform operations such as those represented by the flowchart of FIG. 6.

The example binaural render circuitry 316 obtains the middle AoA parameters from the example linear interpolator circuitry 314, the beamformed audio signals from the example beamform circuitry 304, and both the position and orientation of the example viewer 114 from the face tracker circuitry 312. The example binaural render circuitry 316 selects one of the three beamformed audio signals based on the position data and one of the middle AoA parameters based on the orientation data of the example viewer 114. The example binaural render circuitry 316 then uses the selected beamformed audio signal and middle AoA as inputs to a binaural render technique. As part of the binaural render technique, the example binaural render circuitry 316 may use a head-related transfer function (HRTF). A HRTF refers to a mathematical function that models how an ear receives sound from a given point. The result of the binaural render technique is a final audio signal that the example binaural render circuitry 316 provides to one or more example audio devices 112. In some examples, the example binaural render circuitry 316 is instantiated by processor circuitry executing network interface instructions and/or configured to perform operations such as those represented by the flowchart of FIG. 6.

The example capture arrays 104A, 104B, 104C (i.e., the physical bars) record A/V data of the example speaker 102 from a plurality of perspectives. The example A/V system 100 supports a range of possible viewer 114 orientations by rendering data from different perspectives based on the orientation. By modeling virtual bars to determine an accurate middle AoA and fading transitions between audio data channels, the example A/V system 100 more accurately renders audio when the viewer is at an extreme orientation.

In some examples, the apparatus includes means for beamforming. For example, the means for beamforming may be implemented by beamform circuitry 304. In some examples, the beamform circuitry 304 may be instantiated by processor circuitry such as the example processor circuitry 912 of FIG. 9. For instance, the beamform circuitry 304 may be instantiated by the example microprocessor 1000 of FIG. 10 executing machine executable instructions such as those implemented by at least blocks 608 of FIG. 6. In some examples, the beamform circuitry 304 may be instantiated by hardware logic circuitry, which may be implemented by an ASIC, XPU, or the FPGA circuitry 1100 of FIG. 11 structured to perform operations corresponding to the machine readable instructions. Additionally or alternatively, the beamform circuitry 304 may be instantiated by any other combination of hardware, software, and/or firmware. For example beamform circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining a location. For example, the means for determining a location may be implemented by coordinate circuitry 306. In some examples, the coordinate circuitry 306 may be instantiated by processor circuitry such as the example processor circuitry 912 of FIG. 9. For instance, the coordinate circuitry 306 may be instantiated by the example microprocessor 1000 of FIG. 10 executing machine executable instructions such as those implemented by at least blocks 610, 612 of FIG. 6. In some examples, the coordinate circuitry 306 may be instantiated by hardware logic circuitry, which may be implemented by an ASIC, XPU, or the FPGA circuitry 1100 of FIG. 11 structured to perform operations corresponding to the machine readable instructions. Additionally or alternatively, the coordinate circuitry 306 may be instantiated by any other combination of hardware, software, and/or firmware. For example coordinate circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for calculating a second plurality of angles corresponding to ones of the virtual capture arrays. For example, the means for calculating a second plurality of angles may be implemented by AoA circuitry 308. In some examples, the AoA circuitry 308 may be instantiated by processor circuitry such as the example processor circuitry 912 of FIG. 9. For instance, the AoA circuitry 308 may be instantiated by the example microprocessor 1000 of FIG. 10 executing machine executable instructions such as those implemented by at least blocks 614 of FIG. 6. In some examples, the AoA circuitry 308 may be instantiated by hardware logic circuitry, which may be implemented by an ASIC, XPU, or the FPGA circuitry 1100 of FIG. 11 structured to perform operations corresponding to the machine readable instructions. Additionally or alternatively, the AoA circuitry 308 may be instantiated by any other combination of hardware, software, and/or firmware. For example AoA circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for interpolating. For example, the means for interpolating may be implemented by linear interpolator circuitry 314. In some examples, the linear interpolator circuitry 314 may be instantiated by processor circuitry such as the example processor circuitry 912 of FIG. 9. For instance, the linear interpolator circuitry 314 may be instantiated by the example microprocessor 1000 of FIG. 10 executing machine executable instructions such as those implemented by at least blocks 616 of FIG. 6. In some examples, the linear interpolator circuitry 314 may be instantiated by hardware logic circuitry, which may be implemented by an ASIC, XPU, or the FPGA circuitry 1100 of FIG. 11 structured to perform operations corresponding to the machine readable instructions. Additionally or alternatively, the linear interpolator circuitry 314 may be instantiated by any other combination of hardware, software, and/or firmware. For example linear interpolator circuitry 314 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for rendering. For example, the means for cross rendering may be implemented by binaural render circuitry 316. In some examples, the binaural render circuitry 316 may be instantiated by processor circuitry such as the example processor circuitry 912 of FIG. 9. For instance, the binaural render circuitry 316 may be instantiated by the example microprocessor 1000 of FIG. 10 executing machine executable instructions such as those implemented by at least blocks 618 of FIG. 6. In some examples, the binaural render circuitry 316 may be instantiated by hardware logic circuitry, which may be implemented by an ASIC, XPU, or the FPGA circuitry 1100 of FIG. 11 structured to perform operations corresponding to the machine readable instructions. Additionally or alternatively, the binaural render circuitry 316 may be instantiated by any other combination of hardware, software, and/or firmware. For example binaural render circuitry 316 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
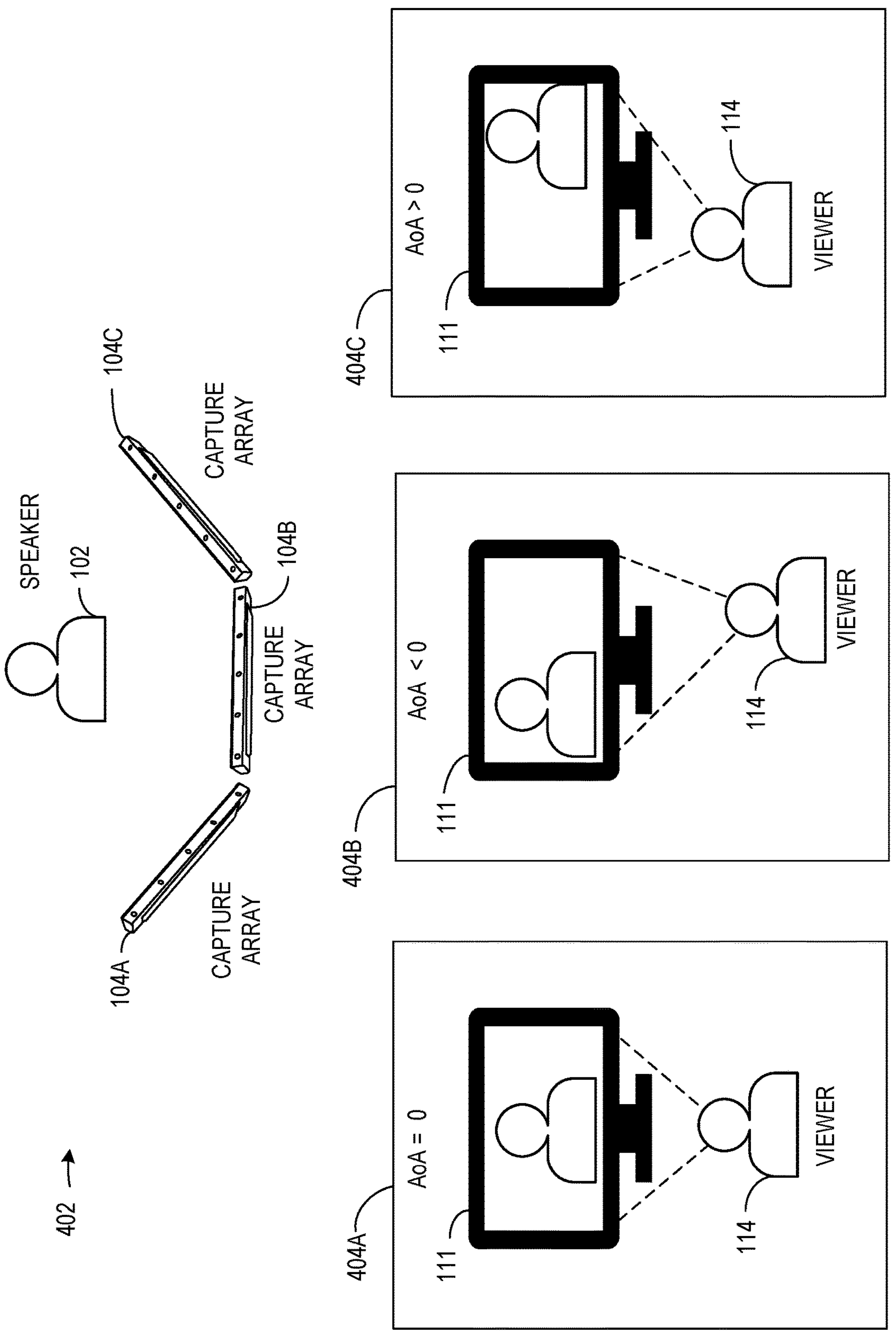
FIG. 4 is an illustrative example of extreme viewer orientations in the A/V system of FIG. 1.

FIG. 4 is an illustrative example of extreme viewer orientations in the A/V system of FIG. 1. FIG. 4 includes an example speaker configuration 402 and example viewer configurations 404A, 404B, 404C. The example speaker configuration 402 includes the example speaker 102 and the example capture arrays 104A, 104B, 104C. Each of the viewer configurations 402A, 402B, 402C include the example viewer 114 and the example display 111.

The example A/V system 100 includes three capture arrays 104A, 104B, 104C located within the environment of the example speaker 102 to record the speaker from a plurality of perspectives. In the example bar configuration of the capture arrays is illustrated in FIG. 4. In the example configuration, capture arrays 104A is positioned to the left of capture array 104B, which in turn is positioned to the left of capture array 104C. While the middle bar (example capture array 104B) is centered relative to the example speaker 102, the left and right bars (example capture arrays 104A, 104C) are both oriented inwards so that microphone and camera sensors on the edge of the bars are closer to the example speaker 102. The example configuration allows each perspective produced by the raw A/V data channels to provide a high quality representation of the example speaker 102.

In the example viewer configuration 404A, the example viewer 114 watches and listens to the immersive media while facing straight forward. This straightforward orientation is recognized by the face tracker circuitry 312, which causes the example binaural render circuitry 316 to select the beamformed audio signal from capture array 104B. As a result, the viewer 104 hears binaural audio from the perspective of capture array 104B, which is positioned directly in front of the speaker 102. The example face tracker circuitry 312 may also cause the example computer circuitry 110 to present the speaker 102 in the middle of the display 111. Furthermore, because the example speaker 102 and example capture array 104A directly face one another, the middle AoA value used for binaural rendering may be at or near zero degrees.

In the example viewer configuration 404B, the example viewer 114 moves to the right to watch and listen to the immersive media. This rightwards movement is recognized by the face tracker circuitry 312, which causes the example binaural render circuitry 316 to select the beamformed audio signal from capture array 104C because the array is to the right of the example speaker 102. As a result, the example viewer 114 hears binaural audio from the perspective of capture array 104C. The example face tracker circuitry 312 may also cause the example computer circuitry 110 to present the speaker 102 on a left portion of the display 111. Furthermore, because the example speaker 102 and example capture array 104C are offset, the middle AoA value used for binaural rendering may be less than zero degrees.

In the example viewer configuration 404C, the example viewer 114 moves to the left to watch and listen to the immersive media. This leftwards movement is recognized by the face tracker circuitry 312, which causes the example binaural render circuitry 316 to select the beamformed audio signal from capture array 104A because the array is to the left of the speaker 102. As a result, the viewer 104 hears binaural audio from the perspective of capture array 104A. The example face tracker circuitry 312 may also cause the example computer circuitry 110 to present the speaker 102 on a right portion of the display 111. Furthermore, because the example speaker 102 and example capture array 104C are offset, the middle AoA value used for binaural rendering may be greater than zero degrees.

The example viewer configurations 404A, 404B, 404C illustrate how the example A/V system 100 changes both visual and audible perspectives based on the orientation of the example viewer 114. Because contextual data decreases at the edge of the example speaker configuration 402, previous solutions to render binaural audio systems may present the same audio to the viewer 114 for both the example viewer configuration 404C (in which the viewer 114 is hearing audio representative of the center of capture array 104A) and a fourth, more a more extreme orientation in which the viewer 114 is looking to the far right and should be hearing audio representative of the left edge of the example capture array 104A. Advantageously, the example A/V system 100 models virtual bars that allow for a computation of middle AoA parameters. When used as an input by the example binaural render circuitry 316, the middle AoA parameters allow the viewer 114 to hear audio that accurately represents their orientation for a wider range of orientations, including orientations that result in emulated audio from the left edge of capture array 104A and the right edge of capture array 104C.

Figure 5:
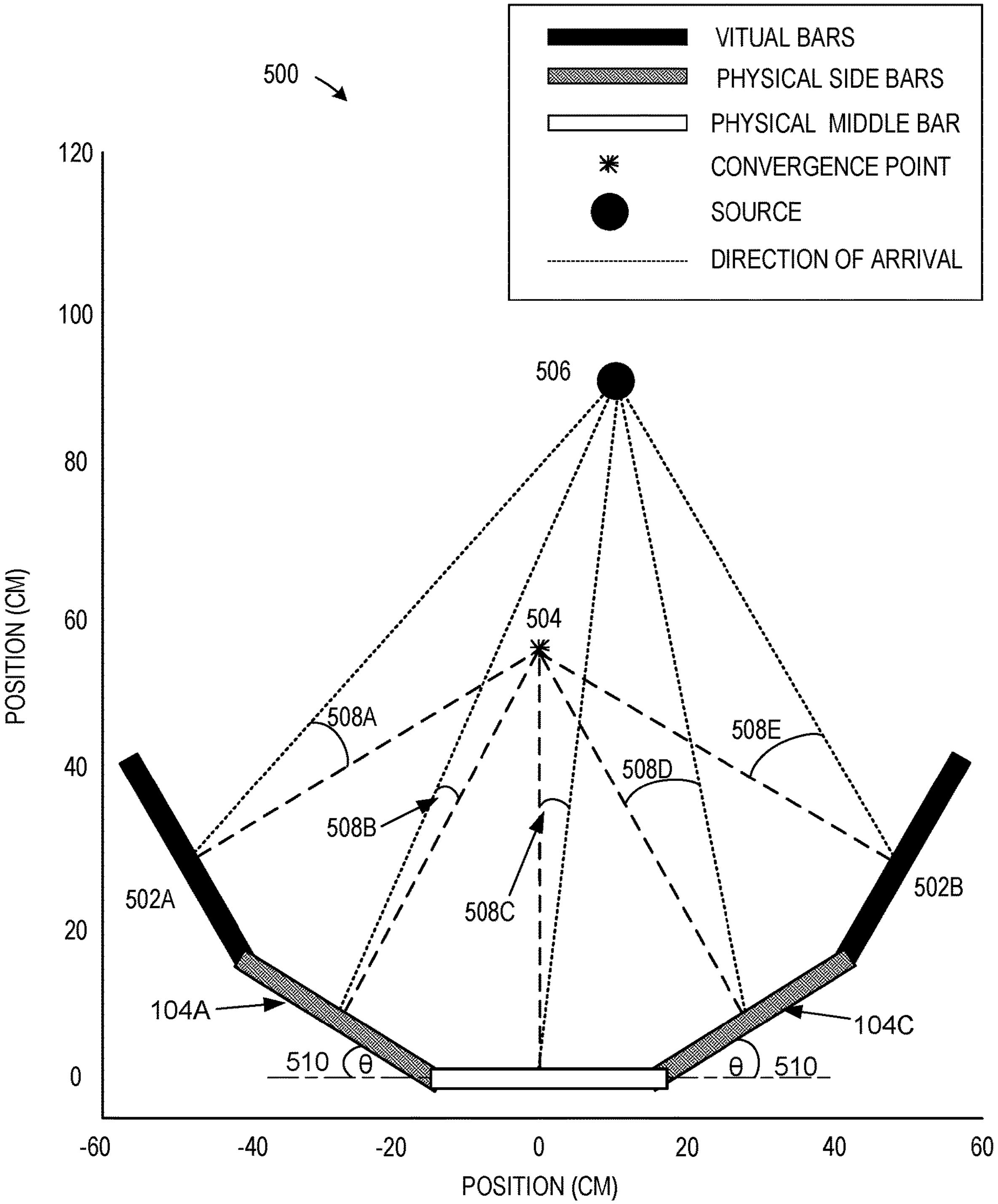
FIG. 5 is a plot that describes the relative position of capture arrays and an audio source within an example implementation of the A/V system of FIG. 1.

FIG. 5 is a plot that describes the relative position of capture arrays and an audio source within an example implementation of the A/V system of FIG. 1. The example plot 500 of FIG. 5 includes virtual bars 502A, 502B, physical bars (the example capture arrays 104A, 104B, 104C), an example convergence point 504, an example audio source 506, example AoA parameters 508A, 508B, 508C, 508D, 508E, and example 9 parameter 510.

The example plot 500 models the speaker configuration 402 on a cartesian plane. For example, the x and y axes both represent distance in centimeters (cm). The example plot 500 is configured such that the origin of the plane (0,0) is located in the geometric center of the capture array 104B (i.e., the middle bar from the speaker configuration 402).

The example virtual bars 502A, 502B illustrate where hypothetical zeroth and fourth bars would be placed in the environment of the speaker 102 to extend the range of viewer 114 orientations that the three physical bars support. In the example plot 500 and example A/V system, the zeroth bar (virtual bar 502A) is placed to the left of the first physical bar (capture array 104A) and the fourth bar is placed to the right of the third physical bar (capture array 104C).

The example convergence point 504 is the point in space where five lines drawn perpendicular to the center of each bar meet. The example real and virtual bars are oriented to form an arc that surrounds the convergence point 504. In doing so, a sound source located at or near the convergence point would produce audio that is strongest for each bar at the center of each bar.

The example audio source 506 produces audio. In the example A/V system 100, the example audio source 506 is the speaker 102. The example plot 500 also includes five straight lines from the center of each bar to the example audio source 506. These lines may be referred to as the direction of arrival for each of the respective bars.

Because the audio source 506 is offset from the example convergence point 504 in the illustrative example of FIG. 5, the directions of arrival do not match the perpendicular lines from the center of each bar. As such, the AoA parameters 508A, 508B, 508C, 508D can be used to quantify the difference between the two lines. An AoA may be used by subtracting the angle of the direction of arrival from the perpendicular line angle (90 degrees). Therefore, if the direction of arrival forms an obtuse angle for a given bar, the example source localizer circuitry 206 will calculate the AoA for said bar to be less than zero. For example, in the example plot 500, the zeroth and first bars (virtual bar 502A and capture array 104A, respectively) have AoA values less than 0. Similarly, the example source localizer circuitry 206 may calculate AoA values greater than zero for bars with acute direction of arrival angles.

After the example server 108 provides the AoA parameters and the coordinates of the physical bars to the example computer circuitry 110, the example coordinate circuitry 306 can determine the coordinates of the example audio source 506. The computation performed by the coordinate circuitry 306 to determine audio source coordinates is provided below in equations (1) and (2):

$$x_{src} = \frac{\tan(AoA_1) * x_1 - \tan(AoA_3) * x_3 - y_1 + y_3}{\tan(AoA_1) - \tan(AoA_3)} \quad (1)$$

-continued $$y_{src} = \tan(AoA_1) * (x_{src} - x_1) + y_1 \quad (2)$$

In example equations described above and herein, the virtual bar 502A may be described as bar 0, example capture array 104A may be described as bar 1, example capture array 104B may be described as bar 2, example capture array 104C may be described as bar 3, and the virtual bar 502B may be described as bar 4. With such numbering, $AoA_n$ refers to the AoA parameter for the center of the corresponding bar, $x_n$ refers to the x coordinate of the of corresponding bar, and $y_n$ refers to they coordinate of the corresponding bar.

The example coordinate circuitry 306 also determines the coordinates of the virtual bars 502A, 502B. The computation performed by the coordinate circuitry 306 to determine virtual bar coordinates is provided below in equations (3) and (4):

$$x_{virtual} = \pm\left(\frac{L}{2} + L\cos(\theta) + \frac{L}{2}\cos(2\theta)\right) \quad (3)$$

$$y_{virtual} = \left(L\sin(\theta) + \frac{L}{2}\sin(2\theta)\right) \quad (4)$$

In equations (3) and (4), L refers to the length of a bar. In some examples, L may be a pre-determined value determined by the dimensions of the rectangular packaging of the capture arrays 104A, 104B, 104C. In such examples, the example coordinate circuitry 306 models the virtual bars 502A, 502B with the same dimensions as the physical bars. θ in equations (3) and (4) refers to the example θ parameter 510, which is the angle of the capture arrays 104A, 104C with respect to the x axis. Furthermore, because the example speaker configuration 402 is symmetrical about the center of the example capture array 104B, capture arrays 104A, 104C are both oriented at the same angle (example θ parameter 510) with respect to the x axis.

The example AoA circuitry 308 uses the coordinates of the audio source 506 and the coordinates of the virtual bars 502A, 502B when determining the AoA parameters of the virtual bars 502A, 502B. The computation performed by the AoA circuitry 308 to determine the AoA of virtual bars is provided below in equations (5) and (6):

$$AoA_0 = \tan^{-1}\left(\frac{x_{src} - x_0}{y_{src} - y_0}\right) - 2\cdot\theta \quad (5)$$

$$AoA_0 = \tan^{-1}\left(\frac{x_{src} - x_4}{y_{src} - y_4}\right) + 2\cdot\theta \quad (6)$$

In equations (5) and (6), ($x_{src}$, $y_{src}$) refer to the coordinates of the example audio source 506 that are derived from equations (1) and (2). Similarly, ($x_0$, $y_0$) and ($x_4$, $y_4$) refer to the coordinates of the virtual bars 502A, 502B respectively that are derived from equations (3) and (4).

The example plot 500 illustrates how the example coordinate circuitry 306 quantifies the example speaker configuration 402 with respect to the center physical bar. Using the coordinate system illustrated by the example plot 500, the example face tracker circuitry 312 to determine emulated viewer perspective coordinates. As used herein, emulated viewer perspective coordinates refer to a location on one of the physical bars that accurately depict where the example viewer 114 should hear sound from based on their position. The example face tracker circuitry 312 then compares the emulated viewer perspective coordinates to the coordinates of the centers of each bar to determine which two bars should be selected for linear interpolation. By modeling virtual bars 502A, 502B, the example computer circuitry 110 allows the face tracker circuitry 312 to select a virtual bar when appropriate (e.g., when the viewer is at an extreme orientation, causing the emulated viewer perspective coordinates to be close to the one of the virtual bars). In turn, linear interpolation with an AoA from a virtual bar produces new AoA parameters for binaural rendering that would otherwise be unavailable in previous solutions. As such, the example computer circuitry 110 expands the range of accurate binaural acoustic rendering when compared to previous solutions.

While an example manner of implementing the example computer circuitry 110 of FIG. 1 is illustrated in FIG. 3, one or more of the elements, processes, and/or devices illustrated in FIG. 2 may be combined, divided, re-arranged, omitted, eliminated, and/or implemented in any other way. Further, the example network interface circuitry 302, example beamform circuitry 304, example coordinate circuitry 306, example AoA circuitry 308, example camera sensor circuitry 310, example face tracker circuitry 312, example linear interpolator circuitry 314, and example binaural render circuitry 316, and/or, more generally, the example computer circuitry 110 of FIG. 1, may be implemented by hardware alone or by hardware in combination with software and/or firmware. Thus, for example, any of the example network interface circuitry 302, example beamform circuitry 304, example coordinate circuitry 306, example AoA circuitry 308, example camera sensor circuitry 310, example face tracker circuitry 312, example linear interpolator circuitry 314, and example binaural render circuitry 316, and/or, more generally, the example computer circuitry 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example computer circuitry 110 of FIG. 1 may include one or more elements, processes, and/or devices in addition to, or instead of, those illustrated in FIG. 3, and/or may include more than one of any or all of the illustrated elements, processes and devices.

Figure 6:
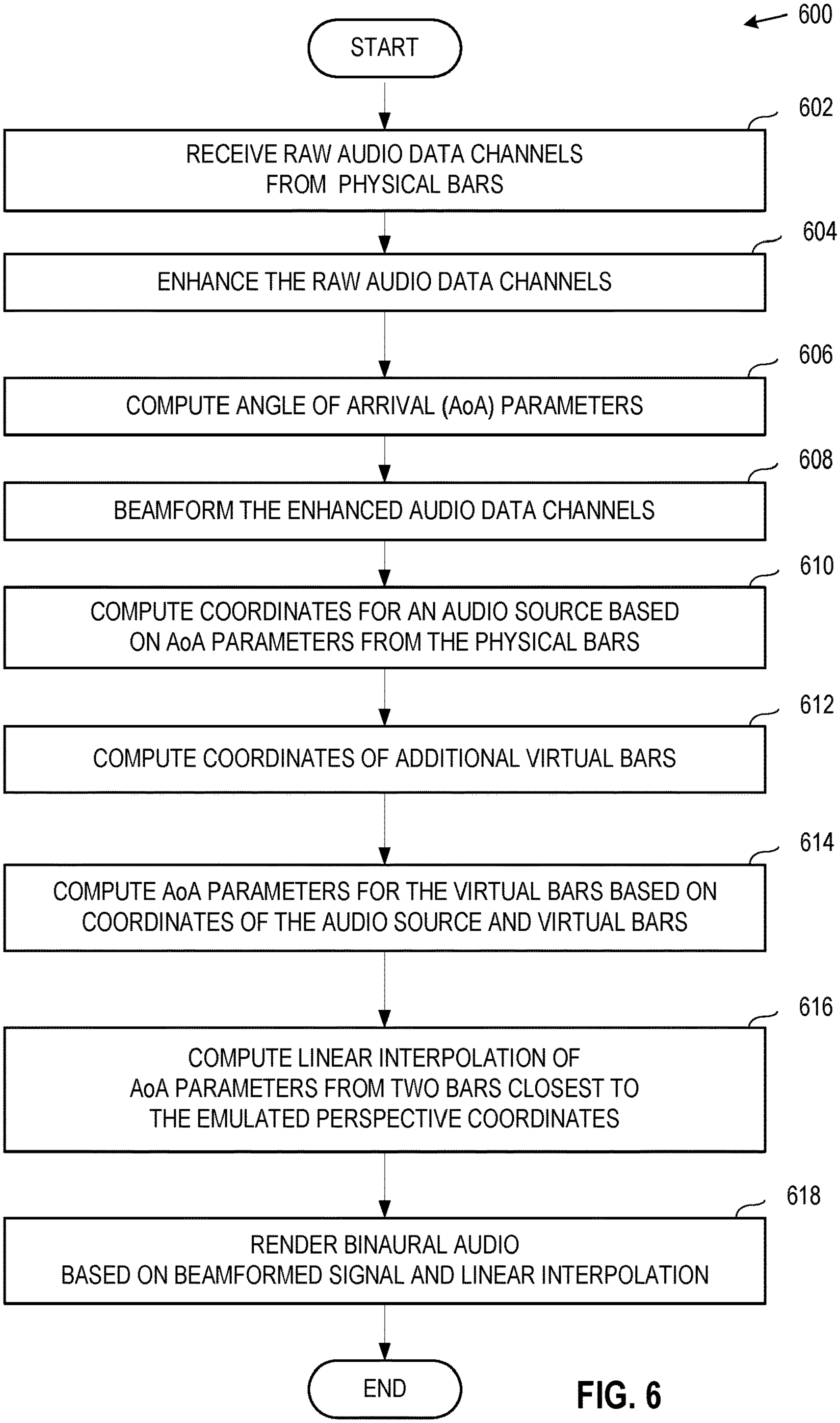
FIG. 6 is a flowchart representative of example machine readable instructions and/or example operations that may be executed by example processor circuitry to render binaural audio with smooth transitions.

A flowchart representative of example machine readable instructions, which may be executed to configure processor circuitry to implement the computer circuitry 110 of FIG. 3, is shown in FIG. 6. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIG. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example computer circuitry 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to render binaural audio with smooth transitions. The machine readable instructions and/or the operations 600 of FIG. 3 begin when the example network interface circuitry 202 receives raw audio data channels from physical bars. (Block 602). In the example machine readable instructions and/or the operations 600 and example A/V system 100, the example network interface circuitry 202 receives such parameters from the example capture arrays 104A, 104B, 104C via the example network 106. In other examples that do not implement the example server 108, the example network interface circuitry 302 receives the raw audio data channels from the example capture arrays 104A, 104B, 104C at block 602.

The example far field signal enhancer circuitry 204 enhances the raw audio data channels. (Block 604). To enhance the raw audio data channels, the example far field enhancer signal circuitry 204 may use GCC-PHAT to measure time delay between the physical bars and synchronize the data based on the time delay. In other examples that do not implement the example server 108, the example far field signal enhancer circuitry 204 may be implemented within the example computer circuitry 110.

The example source localizer circuitry 206 computes AoA parameters. (Block 606). The AoA of a given physical bar (e.g., example capture array 104A) quantifies the angle between a first line from the physical bar to the example convergence point 504 and a second line from the physical bar to the audio source 506. In other examples that do not implement the example server 108, the example source localizer circuitry 206 may be implemented within the example computer circuitry 110.

The example beamform circuitry 304 beamforms the enhanced audio data channels. (Block 608). To beamform the enhanced audio data channels, the example beamform circuitry 304 may align and merge data channels, and/or use any signal processing technique, such that audio data corresponding to the direction of arrival is increased in amplitude and audio data corresponding to other directions is decreased in amplitude.

The example coordinate circuitry 306 computes coordinates for an audio source based on AoA parameters from the physical bars. (Block 610). The audio source of block 610 may be any source of sound within the environment of the speaker 102, including but not limited to the example speaker 102 themselves. The computation performed by the example coordinate circuitry 306 at block 610 is given by equations (1) and (2) above.

The example coordinate circuitry 306 computes coordinates of additional virtual bars. (Block 612). In the example machine readable instructions and/or the operations 600 and example A/V system 100, the example coordinate circuitry 306 calculates coordinates for two additional bars (i.e., virtual bars 502A, 502B). In examples with a different number of physical bars in the environment of the example speaker 102, the example coordinate circuitry 306 may compute a different number of additional virtual bars. The computation performed by the example coordinate circuitry 306 at block 612 is given by equations (3) and (4) above.

The example AoA circuitry 308 computes AoA parameters for the virtual bars based on the coordinates of the audio source from block 610 and coordinates of the virtual bars from block 612. (Block 614). The computation performed by the example coordinate circuitry 306 at block 614 is given by equations (5) and (6) above.

The example linear interpolator circuitry 314 performs a linear interpolation between two AoA parameters. (Block 616). Each AoA parameter selected by the example linear interpolator circuitry 314 may correspond to the center of a physical or virtual bar. The example linear interpolator circuitry 314 selects two AoA parameters for linear interpolation based on the orientation of the example viewer 114, which is recorded by the example camera sensor circuitry 310 and tracked by the example face tracker circuitry 312. The interpolated angles may be referred to as middle AoA parameters.

The example binaural render circuitry 316 renders binaural audio based on the selected cross fade signal and the linear interpolation. (Block 618). The middle AoA parameters may be used as inputs to a binaural render algorithm that uses a HRTF to produce final audio played by one or more audio devices 112. The final audio is based on the orientation of the example viewer 114 and represents what the example viewer 114 may hear if located in the environment of the example speaker 102.

In some examples, the example A/V system 100 may execute block 612 and determine virtual bar coordinates before an immersive media experience begins. During the immersive media experience, the example A/V system 100 may continuously execute blocks 602-610 and 614-618 to record A/V data, track viewer position, update AoA parameters, render binaural audio, etc. The example A/V system 100 may continue to execute blocks 602-610 and 614-618 until the example immersive media experience ends for the viewer 114. The immersive media experience may end for the viewer 114 when the viewer 114 chooses to stop watching and listening to the media, or when the example speaker 102 chooses to stop creating the media.

Figure 7:
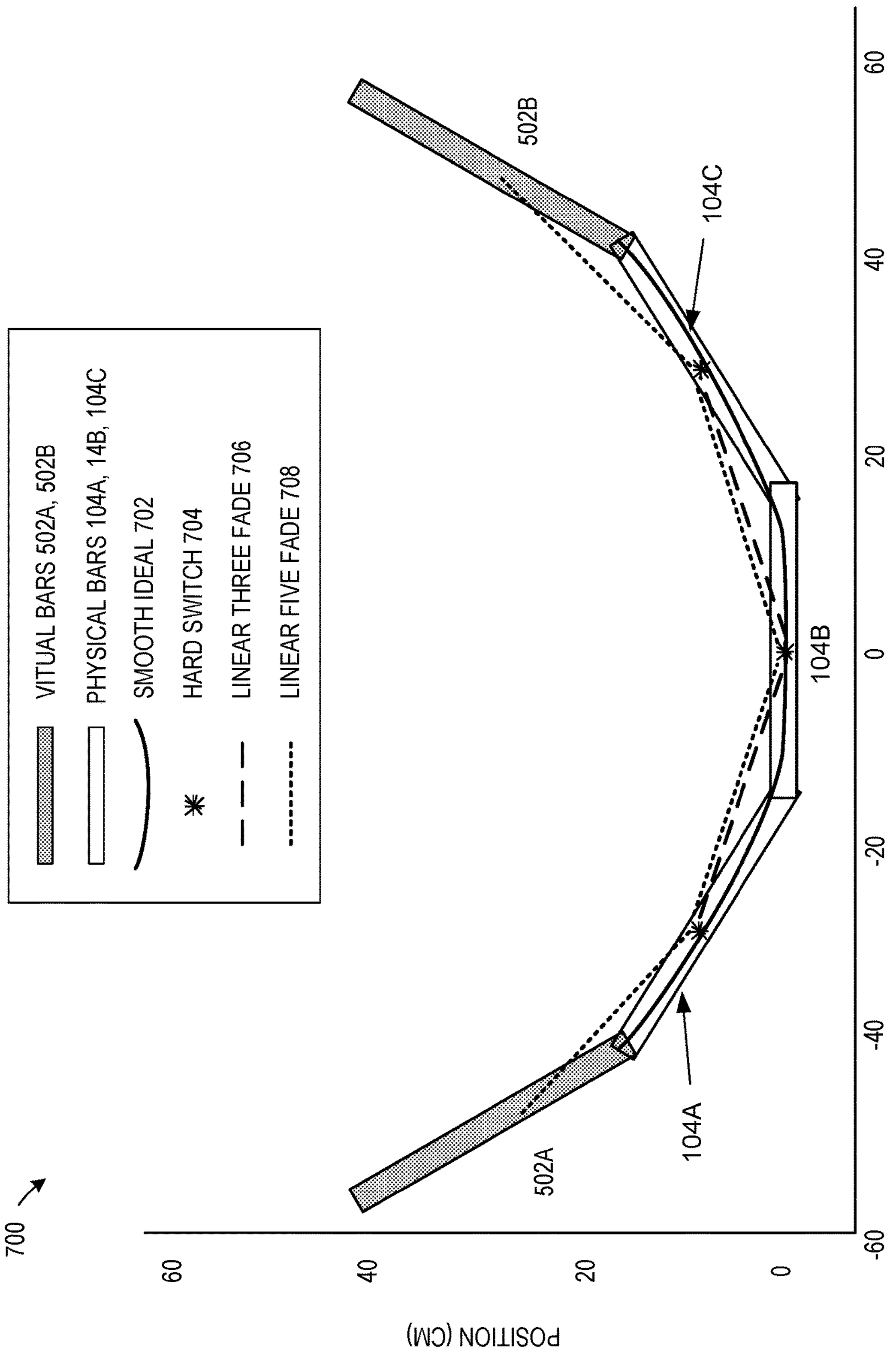
FIG. 7 is an example plot of the angle of arrival used by the binaural renderer circuitry of FIG. 4.

FIG. 7 is an example plot of the angle of arrival used by the binaural renderer circuitry of FIG. 4. The example plot 700 includes the example virtual bars 502A, example 502B, the example capture arrays 104A, 104B, 104C, an example smooth ideal signal 702, hard switch data points 704, a linear three fade signal 706, and example linear five fade signal 708.

The example plot 700 shows how audio is rendered for the example speaker configuration 402 by various techniques. Like the example plot 500, the x and y axes of the example plot 500 form a coordinate system within the environment of the example system in which the origin (0 cm, 0 cm) is the center of example capture array 104B. The x and y axes of the example plot 700 describe distances from the center of the example capture array 104B in units of cm.

The example smooth ideal signal 702 represents the emulated viewer perspective coordinates at each possible viewer perspective. For example, as an example viewer 114 moves from rightwards facing to leftwards facing, the emulated viewer perspective coordinates update from the left edge of bar 1 (e.g., approximately (−40 cm, +10 cm)) to the right edge of bar 3 (e.g., approximately (+40 cm, +10 cm)). When plotted as the smooth ideal signal 702, the example viewer perspective coordinates form an arc shape across the capture arrays 104A, 104B, 104C.

The hard switch data points 704 represent AoA parameters that may be provided by a first previous implementation to render audio from the example speaker configuration 402. The first previous implementation does not interpolate AoA parameters and does not model virtual bars. As a result, the first previous implementation only calculates three AoA parameters. These three AoA parameters each represent the center of a physical bar and are shown in the example plot 700 as the hard switch data points 704. Therefore, with the first previous implementation, a viewer at an extreme orientation that should hear audio from the perspective of the left edge of the capture array 104A (e.g., approximately (−40 cm, +10 cm)) would instead hear audio from the perspective of the center of the capture array 104A (e.g., from approximately (−30 cm, +7 cm)).

Furthermore, suppose a leftwards shift in the orientation of the example viewer 114 causes the emulated viewer perspective coordinates to change from the right side of the capture array 104A (e.g., approximately (−20 cm, 0 cm)) to the left side of the capture array 104B (e.g., approximately (−10 cm, 0 cm)). In such a scenario, a viewer using the first previous implementation would hear audio that switches from the perspective of the center of the capture array 104A directly to the perspective of the center of the capture array 104B. Such a switch may cause audio discontinuity and a lower quality experience for the example viewer 114. Hard switching is discussed further in connection with FIG. 8.

The linear three fade signal 706 represents AoA parameters that may be provided by a previous implementation to render audio such as Pitch Synchronous Overlap and Add (PSOLA). PSOLA interpolates AoA parameters but does not model virtual bars. As a result, the interpolated angles produced by PSOLA only represent viewer perspectives between the center of capture array 104A and the center of capture array 104C. Therefore, with PSOLA, a viewer at an extreme orientation that should hear audio emulated from either the left side of the capture array 104A or the right side of the capture array 104C (e.g., approximately (−40 cm, +10 cm) and approximately (+40 cm, +10 cm), respectively) would instead hear audio emulated from the center of the closest physical bar.

The example linear five fade signal 708 represents AoA parameters that are produced by the example linear interpolator circuitry 314 in accordance with the teachings of this disclosure. In addition to the three AoA parameters for the physical bars computed by the example source localizer circuitry 206, the example AoA circuitry 308 uses equations (5) and (6) to calculate fourth and fifth AoA parameters that represent the center of example virtual bars 502A and 502B respectively. As a result, when the example viewer 114 is at an extreme orientation that results in emulated viewer perspective coordinates at the left edge of the capture array 104A, the example linear interpolation circuitry can interpolate values between $AoA_0$ and $AoA_1$ to produce middle AoA values that accurately represent the emulated viewer perspective coordinates. Similarly, when a different extreme orientation results in emulated viewer perspective coordinates at the right edge of the capture array 104C, the example linear interpolation circuitry can interpolate values between $AoA_3$ and $AoA_4$.

The example plot 700 shows how various implementations to render audio for the speaker configuration 402 produce AoA parameters. By modeling virtual bars 502A, 502B, the example computer circuitry 110 produces the example linear five fade signal 708, which matches the example smooth ideal signal 702 better than the first or second previous implementation and improves the audio quality for the example viewer 114.

Figure 8:
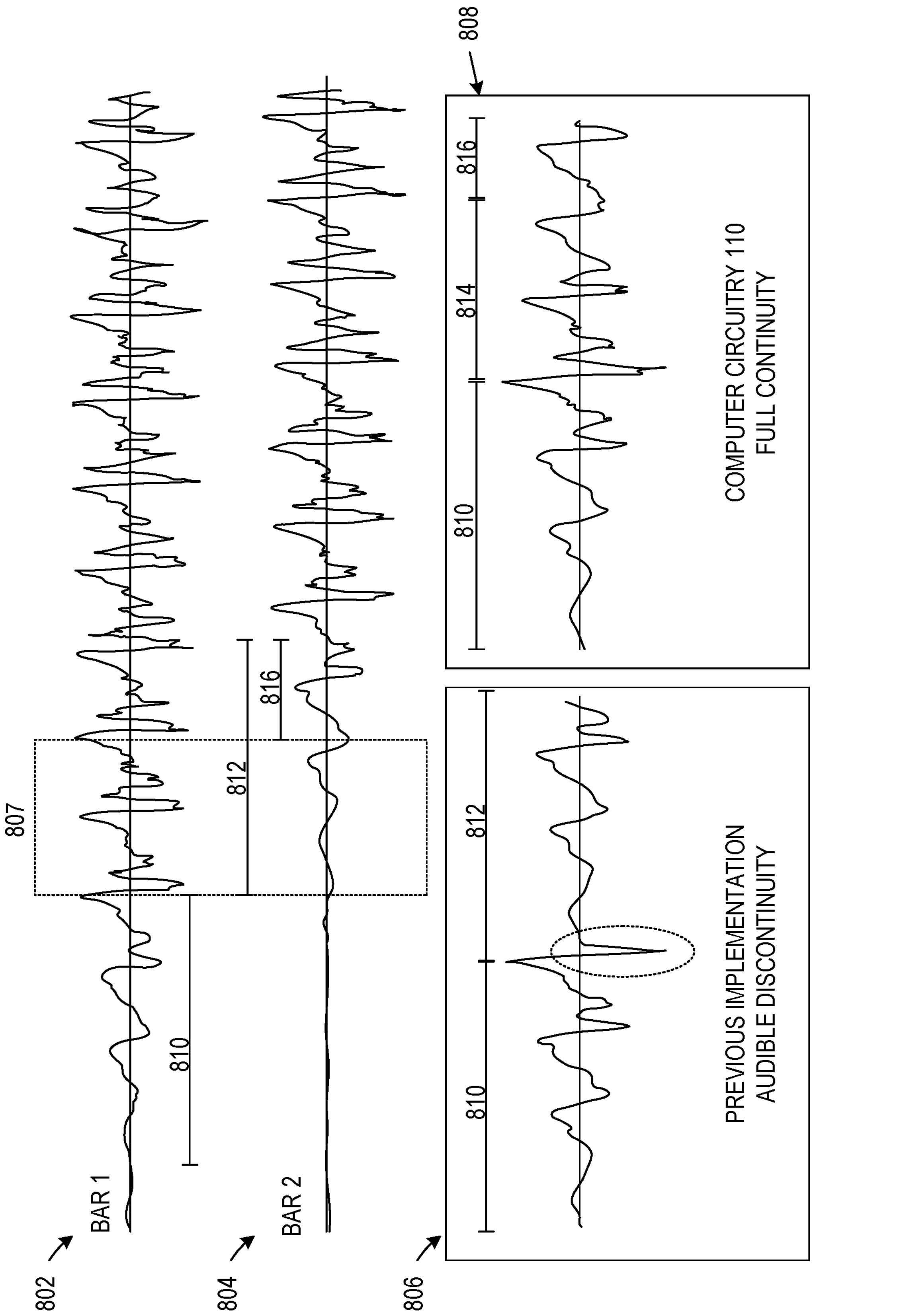
FIG. 8 is an illustrative example comparing the performance of the cross fader circuitry of FIG. 4 to previous implementations that hard switch audio signals.

FIG. 8 is an illustrative example comparing the performance of the example computer circuitry 110 to previous implementations that hard switch audio signals. The illustrative example of FIG. 8 includes example bar signals 802, 804, a previous implementation signal 806, an example computer circuitry signal 808, and an example time window 807. FIG. 8 also includes example time segments 810, 812, 814, and 816.

The example bar signal 802 describes an audio signal from the center microphone sensor on the example capture array 104A. Similarly, the example bar signal 804 describes an audio signal from the center microphone sensor on the example capture array 104B. The example bar signals 802, 804 are both on a time axis. These time axes are aligned vertically within the illustrative example of FIG. 8 so audio from the example bar signal 802 for a given point in time is illustrated directly above audio from the example bar signal 804 for the same point in time. During the time window 807, the example viewer 114 changes their orientation such that the example face tracker circuitry 312 continually updates the emulated viewer perspective coordinates to move from the center of bar 1 (i.e., approximately (−30 cm, +7 cm) on the example plot 700) to the center of bar 2 (i.e., (0 cm, 0 cm) on the example plot 700) in a smooth, circular pattern.

The previous implementation signal 806 represents audio generated using a previous implementation that hard switches between audio signals. Therefore, when the example viewer 114 changes orientation during the time window 807, the previous implementation stops playing audio from the bar signal 802, as shown in the time segment 810, and makes a hard switch to the bar signal 804, as shown in the time segment 812. This hard switch causes audible discontinuity in the sounds heard by the viewer during the circled section of the previous implementation signal 806.

Furthermore, the audio played by the previous implementation during the time window 807 is not representative of the viewer's orientation. For example, during the time window 807, the viewer moves between intermediate orientations whose emulated viewer perspective coordinates map to the right edge of bar 1 and the left edge of bar 2. However, the previous implementation signal 806 only contains audio from the center of bar 1 and the center of bar 2.

The example computer circuitry signal 808 represents audio generated by the example computer circuitry 110. Before the time window 807, the example computer circuitry 110 plays the bar signal 802, as shown in time segment 810. When the example viewer 114 shifts their orientation in the example time window 807, the example linear interpolator circuitry 314 produces intermediate AoA angles between $AoA_1$ and $AoA_2$. These middle AoA angles are used as inputs to the example binaural render circuitry 316. In turn, the example binaural render circuitry 316 synthesizes new audio during the time segment 814 that accurately represents the changing intermediate viewer orientations. When the example viewer 114 stops moving, the example face tracker circuitry 312 maps the emulated viewer perspective coordinates to the center of bar 2, causing the example binaural render circuitry 316 to play audio from the bar signal 804 as shown in the time segment 814. As a result, the audio rendered for the example viewer 114 changes sources without audible discontinuity.

Figure 9:
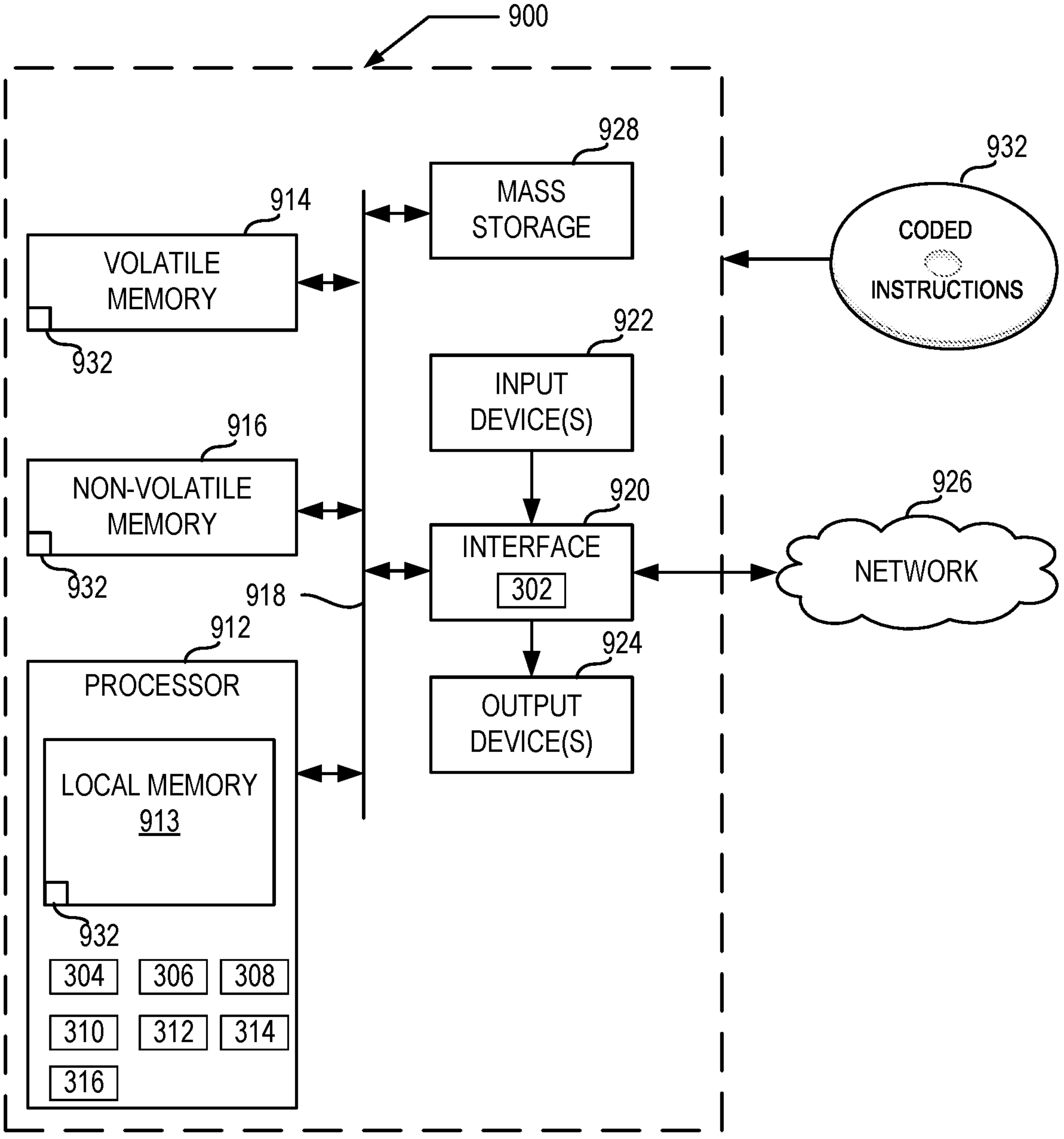
FIG. 9 is a block diagram of an example processing platform including processor circuitry structured to execute the example machine readable instructions and/or the example operations of FIG. 6 to implement the computer circuitry of FIG. 4.

FIG. 9 is a block diagram of an example processor platform 900 structured to execute and/or instantiate the machine readable instructions and/or the operations of FIG. 6 to implement the example computer circuitry 110 of FIG. 3. The processor platform 900 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 example beamform circuitry 304, example coordinate circuitry 306, example AoA circuitry 308, example camera sensor circuitry 310, example face tracker circuitry 312, example linear interpolator circuitry 314, and example binaural render circuitry 316.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIG. 6, may be stored in the mass storage device 928, in the volatile memory 914, in the non-volatile memory 916, and/or on a removable non-transitory computer readable storage medium such as a CD or DVD.

Figure 10:
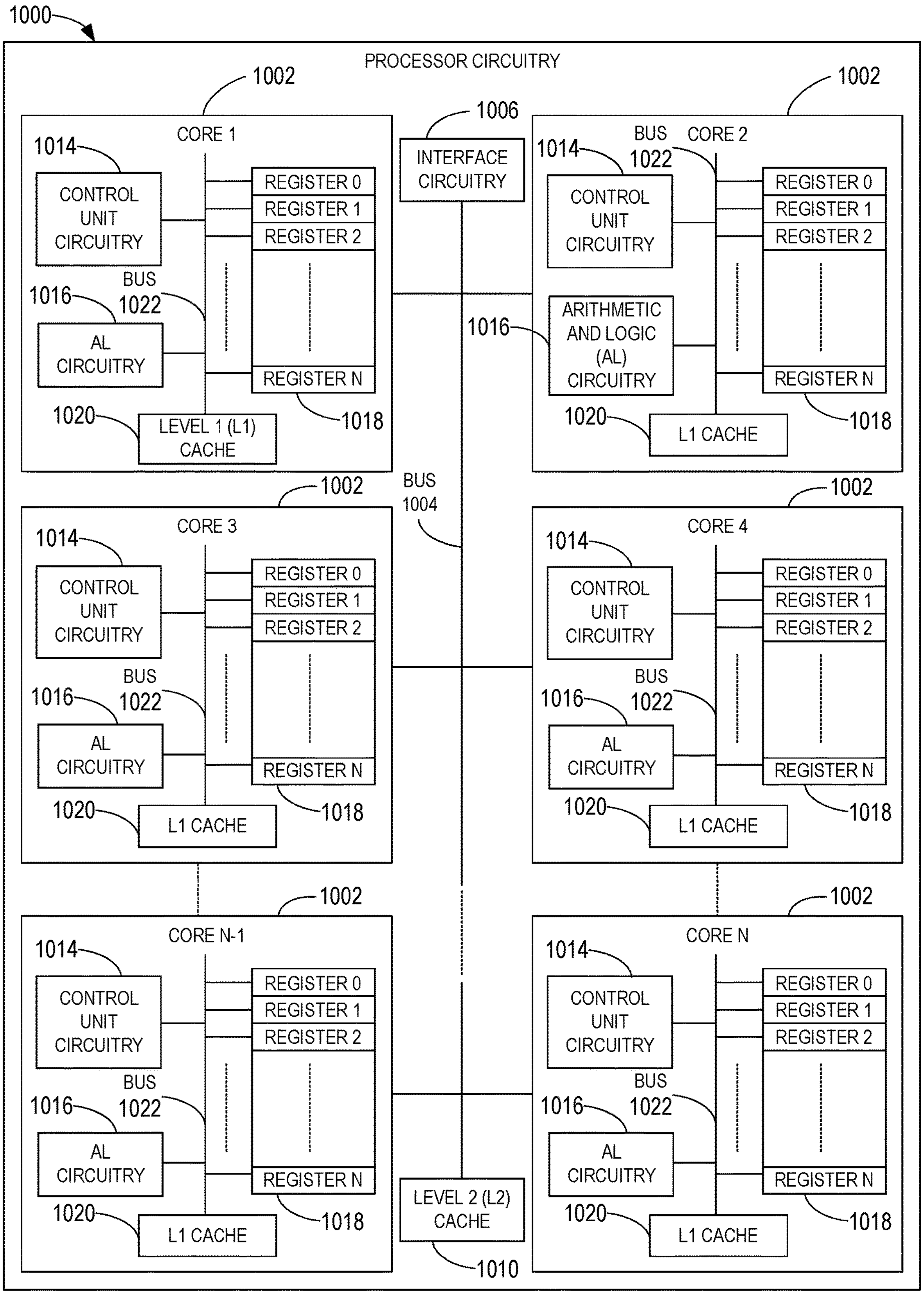
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowchart of FIG. 6 to effectively instantiate the example computer circuitry 110 of FIG. 3 as logic circuits to perform the operations corresponding to those machine readable instructions. In some such examples, the example computer circuitry 110 of FIG. 2 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIG. 6.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
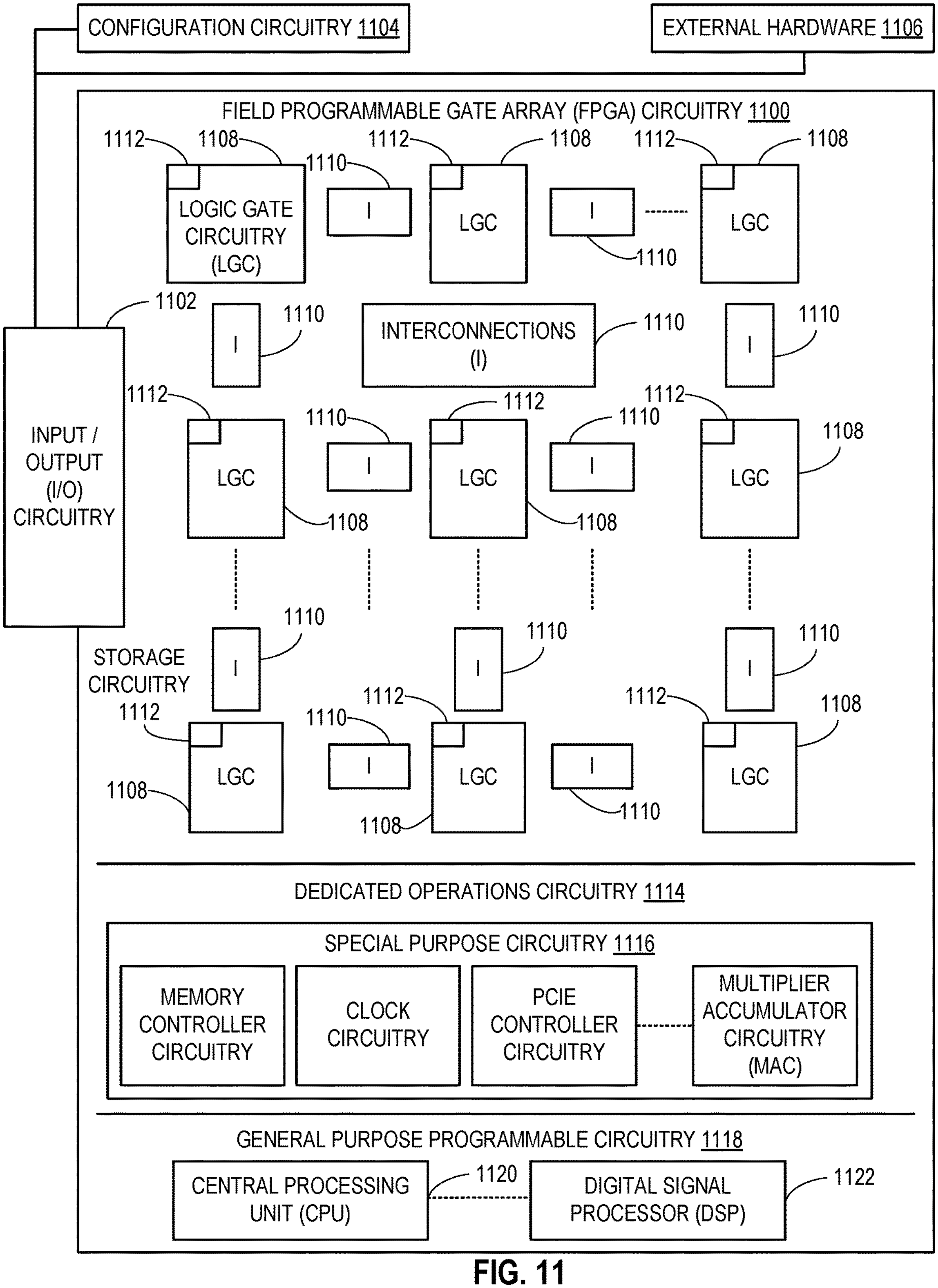
FIG. 11 is a block diagram of another example implementation of the processor circuitry of FIG. 9.

FIG. 11 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIG. 6 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIG. 6. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIG. 6. As such, the FPGA circuitry 1100 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 6 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIG. 6 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIG. 6 may be executed by one or more of the cores 1002 of FIG. 10, a second portion of the machine readable instructions represented by the flowchart of FIG. 6 may be executed by the FPGA circuitry 1100 of FIG. 11, and/or a third portion of the machine readable instructions represented by the flowchart of FIG. 6 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
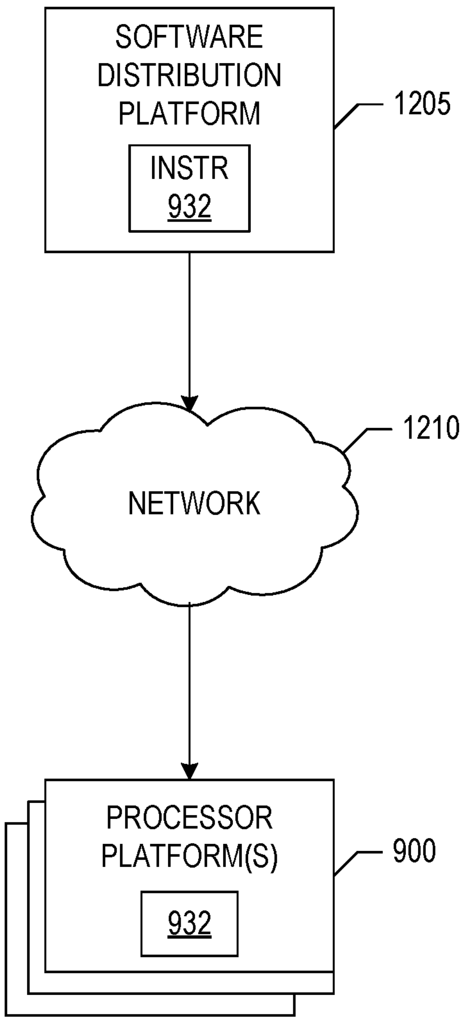
FIG. 12 is a block diagram of an example software distribution platform (e.g., one or more servers) to distribute software (e.g., software corresponding to the example machine readable instructions of FIG. 9) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions 600 of FIG. 6, as described above. The one or more servers of the example software distribution platform 1205 are in communication with an example network 1210, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions 600 of FIG. 6, may be downloaded to the example processor platform 900, which is to execute the machine readable instructions 932 to implement the example computer circuitry 110. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that expand acoustic rendering ranges. Disclosed systems, methods, apparatus, and articles of manufacture improve the efficiency of using a computing device by modeling virtual bars within an environment of a speaker and using the virtual bars to interpolate angles representative of extreme viewer orientations. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to expand acoustic rendering ranges are disclosed herein. Further examples and combinations thereof include the following.

Example 1 includes an apparatus to expand acoustic rendering ranges comprising interface circuitry to obtain audio data channels produced by physical capture devices, and location data of the physical capture devices, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate source localizer circuitry to calculate a first plurality of angles corresponding to ones of the physical capture devices, the first plurality of angles to describe how sound produced by an audio source arrives to the physical capture devices, coordinate circuitry to calculate a location of the audio source based on the first plurality of angles, and calculate locations of virtual capture arrays based on the location data of the plurality of physical capture arrays, angle of arrival circuitry to calculate a second plurality of angles corresponding to ones of the virtual capture arrays, the second plurality of angles to describe how sound produced by the audio source would arrive to the virtual capture arrays, linear interpolator circuitry to interpolate between two angles from either of the first plurality or the second plurality of angles, and renderer circuitry to render a binaural audio signal based on the audio data channels and the interpolated angle.

Example 2 includes the apparatus of example 1, wherein the renderer circuitry is further to implement a head-related transfer function (HRTF) to render the binaural audio signal.

Example 3 includes the apparatus of example 1, wherein the apparatus further includes face tracker circuitry to monitor an orientation of a viewer, and the linear interpolator circuitry is further to select the two angles based on the orientation of the viewer.

Example 4 includes the apparatus of example 3, wherein an angle from the first plurality of angles corresponds to coordinates on the center of a physical capture array, an angle from the second plurality of angles corresponds to coordinates on the center of a virtual capture array, the face tracker circuitry is further to determine emulated viewer perspective coordinates on one of the physical capture arrays based on the orientation of the viewer, and the linear interpolator circuitry is further to select the two angles from the first plurality and second plurality with corresponding coordinates that are closest to the emulated viewer perspective coordinates.

Example 5 includes the apparatus of example 1, wherein the interpolated angle corresponds to coordinates on an edge of a physical capture device.

Example 6 includes the apparatus of example 1, further including beamform circuitry to align and merge ones of the audio data channels such that audio data corresponding to the first plurality of angles is increased in amplitude and audio data corresponding to other directions is decreased in amplitude.

Example 7 includes the apparatus of example 1, wherein the physical capture devices record audio from the audio source independently of one another, and the apparatus further includes enhancer circuitry to synchronize the audio data channels in time.

Example 8 includes a non-transitory machine readable storage medium comprising instructions that, when executed, cause processor circuitry to at least obtaining audio data channels produced by physical capture devices, obtaining location data of the physical capture devices, calculate a first plurality of angles corresponding to ones of the physical capture devices, the first plurality of angles to describe how sound produced by an audio source arrives to the physical capture devices, calculate a location of the audio source based on the first plurality of angles, calculate a location of virtual capture arrays based on the location data of the plurality of physical capture arrays, calculate a second plurality of angles corresponding to ones of the virtual capture arrays, the second plurality of angles to describe how sound produced by the audio source would arrive to the virtual capture arrays, interpolate between two angles from either of the first plurality or the second plurality of angles, and render a binaural audio signal based on the audio data channels and the interpolated angle.

Example 9 includes the non-transitory machine readable storage medium of example 8, wherein the instructions, when executed, cause the processor circuitry to implement a head-related transfer function (HRTF) to render the binaural audio signal.

Example 10 includes the non-transitory machine readable storage medium of example 8, wherein the instructions, when executed, cause the processor circuitry to monitor an orientation of a viewer, and select the two angles based on the orientation of the viewer.

Example 11 includes the non-transitory machine readable storage medium of example 10, wherein an angle from the first plurality of angles corresponds to coordinates on the center of a physical capture array, an angle from the second plurality of angles corresponds to coordinates on the center of a virtual capture array, and the instructions, when executed, cause the processor circuitry to determine emulated viewer perspective coordinates on one of the physical capture arrays based on the orientation of the viewer, and select the two angles from the first plurality and second plurality with corresponding points that are closest to the emulated viewer perspective coordinates.

Example 12 includes the non-transitory machine readable storage medium of example 8, wherein the interpolated angle corresponds to coordinates on an edge of a physical capture device.

Example 13 includes the non-transitory machine readable storage medium of example 8, wherein the instructions, when executed, cause the processor circuitry to align and merge ones of the audio data channels such that audio data corresponding to the first plurality of angles is increased in amplitude and audio data corresponding to other directions is decreased in amplitude.

Example 14 includes the non-transitory machine readable storage medium of example 8, wherein the physical capture devices record audio from the audio source independently of one another, and the instructions, when executed, cause the processor circuitry to synchronize the audio data channels in time.

Example 15 includes a method to expand acoustic rendering ranges, the method comprising obtaining audio data channels produced by physical capture devices, and obtaining location data of the physical capture devices, calculating a first plurality of angles corresponding to ones of the physical capture devices, the first plurality of angles to describe how sound produced by an audio source arrives to the physical capture devices, calculating a location of the audio source based on the first plurality of angles, calculating a location of virtual capture arrays based on the location data of the plurality of physical capture arrays, calculating a second plurality of angles corresponding to ones of the virtual capture arrays, the second plurality of angles to describe how sound produced by the audio source would arrive to the virtual capture arrays, interpolating between two angles from either of the first plurality or the second plurality of angles, and rendering a binaural audio signal based on the audio data channels and the interpolated angle.

Example 16 includes the method of example 15, further including implementing a head-related transfer function (HRTF) to render the binaural audio signal.

Example 17 includes the method of example 15, further including monitoring an orientation of a viewer, and selecting the two angles based on the orientation of the viewer.

Example 18 includes the method of example 17, wherein an angle from the first plurality of angles corresponds to coordinates on the center of a physical capture array, an angle from the second plurality of angles corresponds to coordinates on the center of a virtual capture array, and the method further includes determining emulated viewer perspective coordinates on one of the physical capture arrays based on the orientation of the viewer, and selecting the two angles from the first plurality and second plurality with corresponding coordinates that are closest to the emulated viewer perspective coordinates.

Example 19 includes the method of example 15, wherein the interpolated angle corresponds to coordinates on an edge of a physical capture device.

Example 20 includes the method of example 15, further including aligning and merging ones of the audio data channels such that audio data corresponding to the first plurality of angles is increased in amplitude and audio data corresponding to other directions is decreased in amplitude.

Example 21 includes the method of example 15, wherein the physical capture devices record audio from the audio source independently of one another, and the method further includes synchronizing the audio data channels in time.

Example 22 includes an apparatus to expand acoustic rendering ranges comprising means for receiving to receive audio data channels produced by physical capture devices, and location data of the physical capture devices, means for calculating a first plurality of angles corresponding to ones of the physical capture devices, the first plurality of angles to describe how sound produced by an audio source arrives to the physical capture devices, means for determining location to determine a location of the audio source based on the first plurality of angles, and locations of virtual capture arrays based on the location data of the plurality of physical capture arrays, means for calculating a second plurality of angles corresponding to ones of the virtual capture arrays, the second plurality of angles to describe how sound produced by the audio source would arrive to the virtual capture arrays, means for interpolating to interpolate between two angles from either of the first plurality or the second plurality of angles, and means for rendering to render binaural audio signal based on the audio data channels and the interpolated angle.

Example 23 includes the apparatus of example 22, wherein the means for rendering is further to implement a head-related transfer function (HRTF) to render the binaural audio signal.

Example 24 includes the apparatus of example 22, wherein the apparatus further includes means for tracking to track an orientation of a viewer, and the means for interpolating is further to select the two angles based on the orientation of the viewer.

Example 25 includes the apparatus of example 24, wherein an angle from the first plurality of angles corresponds to a point in the center of a physical capture array, an angle from the second plurality of angles corresponds to a point in the center of a virtual capture array, the means for tracking is further to determine a viewer point on one of the physical capture arrays based on the orientation of the viewer, and the means for interpolating is further to select the two angles from the first plurality and second plurality with corresponding points that are closest to the viewer point.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to expand acoustic rendering ranges comprising:

interface circuitry to obtain:

audio data channels produced by physical capture devices; and location data of the physical capture devices; and processor circuitry including one or more of:

at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus;

a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations; or Application Specific Integrated Circuitry (ASIC) including logic gate circuitry to perform one or more third operations;

the processor circuitry to perform at least one of the first operations, the second operations, or the third operations to instantiate:

source localizer circuitry to calculate a first plurality of angles corresponding to ones of the physical capture devices, the first plurality of angles to describe how sound produced by an audio source arrives to the physical capture devices;

coordinate circuitry to:

calculate a location of the audio source based on the first plurality of angles; and calculate locations of virtual capture arrays based on the location data of the plurality of physical capture arrays;

angle of arrival circuitry to calculate a second plurality of angles corresponding to ones of the virtual capture arrays, the second plurality of angles to describe how sound produced by the audio source would arrive to the virtual capture arrays;

interpolator circuitry to interpolate between two angles from either of the first plurality or the second plurality of angles; and renderer circuitry to render a binaural audio signal based on the audio data channels and the interpolated angle.

2. The apparatus of claim 1, wherein the renderer circuitry is further to implement a head-related transfer function (HRTF) to render the binaural audio signal.

3. The apparatus of claim 1, wherein:

the apparatus further includes face tracker circuitry to monitor a position of a viewer; and the interpolator circuitry is further to select the two angles based on the position of the viewer.

4. The apparatus of claim 3, wherein:

an angle from the first plurality of angles corresponds to coordinates on the center of a physical capture array;

an angle from the second plurality of angles corresponds to coordinates on the center of a virtual capture array;

the face tracker circuitry is further to determine emulated viewer perspective coordinates on one of the physical capture arrays based on the position of the viewer; and the interpolator circuitry is further to select the two angles from the first plurality and second plurality with corresponding coordinates that are closest to the emulated viewer perspective coordinates.

5. The apparatus of claim 1, wherein the interpolated angle corresponds to coordinates on an edge of a physical capture device.

6. The apparatus of claim 1, further including beamform circuitry to align and merge ones of the audio data channels such that audio data corresponding to the first plurality of angles is increased in amplitude and audio data corresponding to other directions is decreased in amplitude.

7. The apparatus of claim 1, wherein:

the physical capture devices record audio from the audio source independently of one another; and the apparatus further includes enhancer circuitry to synchronize the audio data channels in time.

8. A non-transitory machine readable storage medium comprising instructions that, when executed, cause processor circuitry to at least:

obtain audio data channels produced by physical capture devices;

obtain location data of the physical capture devices;

calculate a first plurality of angles corresponding to ones of the physical capture devices, the first plurality of angles to describe how sound produced by an audio source arrives to the physical capture devices;

calculate a location of the audio source based on the first plurality of angles;

calculate a location of virtual capture arrays based on the location data of the plurality of physical capture arrays;

calculate a second plurality of angles corresponding to ones of the virtual capture arrays, the second plurality of angles to describe how sound produced by the audio source would arrive to the virtual capture arrays;

interpolate between two angles from either of the first plurality or the second plurality of angles; and render a binaural audio signal based on the audio data channels and the interpolated angle.

9. The non-transitory machine readable storage medium of claim 8, wherein the instructions, when executed, cause the processor circuitry to implement a head-related transfer function (HRTF) to render the binaural audio signal.

10. The non-transitory machine readable storage medium of claim 8, wherein the instructions, when executed, cause the processor circuitry to:

monitor an orientation of a viewer; and select the two angles based on the orientation of the viewer.

11. The non-transitory machine readable storage medium of claim 10, wherein:

an angle from the first plurality of angles corresponds to coordinates on the center of a physical capture array;

an angle from the second plurality of angles corresponds to coordinates on the center of a virtual capture array; and the instructions, when executed, cause the processor circuitry to:

determine emulated viewer perspective coordinates on one of the physical capture arrays based on the orientation of the viewer; and select the two angles from the first plurality and second plurality with corresponding points that are closest to the emulated viewer perspective coordinates.

12. The non-transitory machine readable storage medium of claim 8, wherein the interpolated angle corresponds to coordinates on an edge of a physical capture device.

13. The non-transitory machine readable storage medium of claim 8, wherein the instructions, when executed, cause the processor circuitry to align and merge ones of the audio data channels such that audio data corresponding to the first plurality of angles is increased in amplitude and audio data corresponding to other directions is decreased in amplitude.

14. The non-transitory machine readable storage medium of claim 8, wherein:

the physical capture devices record audio from the audio source independently of one another; and the instructions, when executed, cause the processor circuitry to synchronize the audio data channels in time.

15. A method to expand acoustic rendering ranges, the method comprising:

obtaining audio data channels produced by physical capture devices; and obtaining location data of the physical capture devices;

calculating a first plurality of angles corresponding to ones of the physical capture devices, the first plurality of angles to describe how sound produced by an audio source arrives to the physical capture devices;

calculating a location of the audio source based on the first plurality of angles;

calculating a location of virtual capture arrays based on the location data of the plurality of physical capture arrays;

calculating a second plurality of angles corresponding to ones of the virtual capture arrays, the second plurality of angles to describe how sound produced by the audio source would arrive to the virtual capture arrays;

interpolating between two angles from either of the first plurality or the second plurality of angles; and rendering a binaural audio signal based on the audio data channels and the interpolated angle.

16. The method of claim 15, further including implementing a head-related transfer function (HRTF) to render the binaural audio signal.

17. The method of claim 15, further including:

monitoring an orientation of a viewer; and selecting the two angles based on the orientation of the viewer.

18. The method of claim 17, wherein:

an angle from the first plurality of angles corresponds to coordinates on the center of a physical capture array;

an angle from the second plurality of angles corresponds to coordinates on the center of a virtual capture array; and the method further includes:

determining emulated viewer perspective coordinates on one of the physical capture arrays based on the orientation of the viewer; and selecting the two angles from the first plurality and second plurality with corresponding coordinates that are closest to the emulated viewer perspective coordinates.

19. The method of claim 15, wherein the interpolated angle corresponds to coordinates on an edge of a physical capture device.

20. The method of claim 15, further including aligning and merging ones of the audio data channels such that audio data corresponding to the first plurality of angles is increased in amplitude and audio data corresponding to other directions is decreased in amplitude.

21. The method of claim 15, wherein:

the physical capture devices record audio from the audio source independently of one another; and the method further includes synchronizing the audio data channels in time.

22. An apparatus to expand acoustic rendering ranges comprising:

means for receiving to receive:

audio data channels produced by physical capture devices; and location data of the physical capture devices;

means for calculating a first plurality of angles corresponding to ones of the physical capture devices, the first plurality of angles to describe how sound produced by an audio source arrives to the physical capture devices;

means for determining location to determine:

a location of the audio source based on the first plurality of angles; and locations of virtual capture arrays based on the location data of the plurality of physical capture arrays;

means for calculating a second plurality of angles corresponding to ones of the virtual capture arrays, the second plurality of angles to describe how sound produced by the audio source would arrive to the virtual capture arrays;

means for interpolating to interpolate between two angles from either of the first plurality or the second plurality of angles; and means for rendering to render binaural audio signal based on the audio data channels and the interpolated angle.

23. The apparatus of claim 22, wherein the means for rendering is further to implement a head-related transfer function (HRTF) to render the binaural audio signal.

24. The apparatus of claim 22, wherein:

the apparatus further includes means for tracking to track an orientation of a viewer; and the means for interpolating is further to select the two angles based on the orientation of the viewer.

25. The apparatus of claim 24, wherein:

an angle from the first plurality of angles corresponds to a point in the center of a physical capture array;

an angle from the second plurality of angles corresponds to a point in the center of a virtual capture array;

the means for tracking is further to determine a viewer point on one of the physical capture arrays based on the orientation of the viewer; and the means for interpolating is further to select the two angles from the first plurality and second plurality with corresponding points that are closest to the viewer point.

* * * * *